United States Patent
Joo et al.

(10) Patent No.: US 11,094,999 B2
(45) Date of Patent: *Aug. 17, 2021

(54) HYBRID SEPARATORS AND THE MANUFACTURE THEREOF

(71) Applicant: Cornell University, Ithaca, NY (US)

(72) Inventors: Yong Lak Joo, Ithaca, NY (US);
Joseph M. Carlin, Ithaca, NY (US);
Soshana Smith, Ithaca, NY (US)

(73) Assignee: CORNELL UNIVERSITY, Ithaca, NY (US)

(*) Notice: Subject to any disclaimer, the term of this patent is extended or adjusted under 35 U.S.C. 154(b) by 154 days.

This patent is subject to a terminal disclaimer.

(21) Appl. No.: 16/429,944

(22) Filed: Jun. 3, 2019

(65) Prior Publication Data

US 2019/0288258 A1 Sep. 19, 2019

Related U.S. Application Data

(63) Continuation of application No. 15/981,749, filed on May 16, 2018.

(60) Provisional application No. 62/506,973, filed on May 16, 2017.

(51) Int. Cl.
| | | |
|---|---|---|
| *H01M 50/446* | (2021.01) | |
| *C25D 1/08* | (2006.01) | |
| *H01M 10/0525* | (2010.01) | |
| *H01M 10/42* | (2006.01) | |
| *H01M 50/44* | (2021.01) | |
| *H01M 50/403* | (2021.01) | |
| *H01M 50/411* | (2021.01) | |
| *H01M 50/431* | (2021.01) | |
| *H01M 50/449* | (2021.01) | |

(52) U.S. Cl.
CPC ............ *H01M 50/446* (2021.01); *C25D 1/08* (2013.01); *H01M 10/0525* (2013.01); *H01M 10/4235* (2013.01); *H01M 50/403* (2021.01); *H01M 50/411* (2021.01); *H01M 50/431* (2021.01); *H01M 50/44* (2021.01); *H01M 50/449* (2021.01)

(58) Field of Classification Search
None
See application file for complete search history.

(56) References Cited

U.S. PATENT DOCUMENTS

| | | | |
|---|---|---|---|
| 10,355,257 B2* | 7/2019 | Joo | .......................... C25D 1/08 |
| 2005/0084761 A1 | 4/2005 | Hennige et al. | |
| 2013/0040140 A1 | 2/2013 | Joo et al. | |
| 2015/0099185 A1 | 4/2015 | Joo et al. | |
| 2015/0287967 A1 | 10/2015 | Joo et al. | |

OTHER PUBLICATIONS

Smith, S.A., et al., Effect of polymer and ceramic morphology on the material and electrochemical properties of electrospun PAN/polymer derived ceramic composite nanofiber membranes for lithium ion battery separators, Journal of Membrane Science, Dec. 25, 2016, vol. 526, pp. 315-322.

* cited by examiner

*Primary Examiner* — Jonathan Crepeau
(74) *Attorney, Agent, or Firm* — Johnson, Marcou, Isaacs & Nix LLC; Paul J. Roman, Jr.

(57) ABSTRACT

Provided herein are a variety of porous separator materials, particularly those prepared by gas-assisted electrospray and electrospinning processes.

20 Claims, 16 Drawing Sheets

HYBRID SEPARATORS AND THE MANUFACTURE THEREOF

CROSS REFERENCE TO RELATED APPLICATIONS

This application is a continuation of U.S. patent application Ser. No. 15/981,749, filed on May 16, 2018, which claims priority to U.S. Provisional Application No. 62/506,973, filed on May 16, 2017, the disclosure of each of which is hereby incorporated by reference.

BACKGROUND OF THE INVENTION

Batteries comprise one or more electrochemical cell, such cells generally comprising a cathode, an anode and an electrolyte. Lithium ion batteries are high energy density batteries that are fairly commonly used in consumer electronics and electric vehicles. In lithium ion batteries, lithium ions generally move from the negative electrode to the positive electrode during discharge and vice versa when charging. In the as-fabricated and discharged state, lithium ion batteries often comprise a lithium compound (such as a lithium metal oxide) at the cathode (positive electrode) and another material, generally carbon, at the anode (negative electrode).

The commercial importance of battery safety has recently become critically clear in the wake of many recent lithium ion battery fires and explosions. Commercial airline carriers, shippers, and others have taken to prohibiting the transport of certain lithium ion batteries and consumer electronics devices using lithium ion batteries. As year-over-year lithium ion battery capacity improvements have failed to keep up with demand, many battery companies have become aggressive in their attempts to improve capacity, sometimes at the expense of safety. For example, according to the New York Times, Samsung's recent difficulties with their consumer electronic lithium ion batteries have resulted from design flaws because of their "aggressive design decisions, which made problems more likely." In particular, "[i]n the Note 7, Samsung opted for an exceptionally thin separator in its battery" in order to increase active material loading in the battery and, thereby, increase battery capacity. Because of the extremely thin nature of the separator, a much greater likelihood of failure was likely "if it breaks down, varies in thickness or is damaged by outside pressure."

SUMMARY OF THE INVENTION

Provided in various embodiments herein are separators and separator materials, having improved performance characteristics, as well as processes and materials for manufacturing the same. In some embodiments, separators and separator materials provided herein have good or improved mechanical performance characteristics (e.g., decreases failure rate during compression and/or overheating), rate capabilities (e.g., increases rate of charging), safety profiles (e.g., good thermal stability, reduced fail rate, etc.), wettability (e.g., which further reduces the amount of non-active material required in a battery), and other features, such as relative to commercial materials. In certain instances, separators and separator materials provided herein achieve such characteristics while also being thinner than typical commercial separators (e.g., <25 micron, or thinner).

In some embodiments, provided herein is a porous membrane. In specific embodiments, the porous membrane is or comprises a porous film (e.g., comprising a porous, two-dimensional material) and/or a porous fiber mat (e.g., comprising a non-woven mat of one-dimensional materials that collectively form a porous material). In certain embodiments, the porous membrane, porous film, and/or porous fiber mat comprise polymer and/or ceramic, such as described herein.

In some embodiments, a porous membrane (e.g., film), or component (e.g., fiber) thereof, provided herein comprises a polymer and a continuous ceramic material. In certain embodiments, the porous membrane (e.g., film), or component (e.g., fiber) thereof, comprises a first surface, a second surface and an interior (core) structure. In specific embodiments, the membrane (e.g., film), or component (e.g., fiber) thereof, comprises a continuous coating or shell on or forming (e.g., over at least a portion of) one or both surface(s) of the membrane (e.g., film), or component (e.g., fiber) thereof. In some embodiments, the membrane (e.g., film), or component (e.g., fiber) thereof, comprises a continuous matrix or web within the core of the membrane (e.g., film), or component (e.g., fiber) thereof. In certain embodiments, the membrane (e.g., film), or component (e.g., fiber) thereof, comprises a continuous coating or shell on (e.g., over at least a portion of) one or both surface(s) of the membrane (e.g., film), or component (e.g., fiber) thereof. In some embodiments, the membrane (e.g., film), or component (e.g., fiber) thereof, comprises a continuous matrix or web within the core of the membrane (e.g., film), or component (e.g., fiber) thereof. In certain embodiments, the core of the membrane (e.g., film), or component (e.g., fiber) thereof, further comprises polymer. In some instances, the polymer is highly amorphous (e.g., as a result of the extensive ceramic network also within the core of the membrane (e.g., film), or component (e.g., fiber) thereof). In specific embodiments, the membrane (e.g., film), or component (e.g., fiber) thereof, comprises co-continuous polymer and ceramic (e.g., within the core of the membrane (e.g., film), or component (e.g., fiber) thereof). In certain specific embodiments, the porous membrane is a film comprising any of the morphologies described. In some specific embodiments, the porous membrane comprises one or more fiber comprising any of the morphologies described, such as wherein the fibers collectively form a membrane comprising a (e.g., compressed and/or porous) fiber mat comprising said one or more fiber(s). In specific embodiments, the porous fiber mat provided herein comprises one or more fiber (e.g., nanofiber) comprising co-continuous polymer and ceramic (e.g., within the core of the fiber(s)).

In certain embodiments, provided herein is a porous film. In some embodiments, the porous thin film comprises a porous polymer film (e.g., a porous two-dimensional, polymer matrix). In specific embodiments, the porous thin film comprises a porous polymer film with a ceramic coating at least partially covering one or more surface thereof.

In certain embodiments, provided herein is a porous membrane comprising a polymer-ceramic hybrid material. In specific embodiments, the polymer ceramic hybrid material comprises a (e.g., continuous matrix of a) polymer (e.g., as a substrate material) and a continuous matrix of a ceramic (e.g., as a coating or shelling material). In certain embodiments, the hybrid material is or comprises a film (e.g., comprising a porous, two-dimensional continuous matrix) and/or a fiber mat (e.g., comprising a plurality of one dimensional fibers that collectively form a membrane).

In certain embodiments, a separator, membrane, or thin film has a porosity of about 10% to about 70%. In some embodiments, such as with a thin film or separator comprising a thin film is utilized, a lower porosity is utilized, such as about 10% to about 50%, about 10% to about 40%, or about 20% to about 40%. In some instances, the lower porosity provides for a more continuous material, which, in some instances, allows for improved mechanical characteristics (e.g., reducing deformation during use and/or thermal events) and increased physical barrier surface area between the electrodes of a battery (e.g., reducing the failure rate caused by physical interaction between the electrodes). Further, in certain instances, such materials retain good performance characteristics, such as capacities and rate capabilities, despite the low porosity. In certain embodiments, the high-performance characteristics of thin film separators provided herein combined with the low porosity thereof allow for the use of very thin separators, with good safety and performance profiles. In certain instances, provided herein are separators having a thickness of less than 20 micron, such about 5 micron to about 20 micron, or about 5 micron to about 15 micron.

In some embodiments, such as with a fiber mat or separator comprising a fiber mat is utilized, a higher porosity is utilized, such as about 40% to about 80%, about 40% to about 70%, or the like. In certain embodiments, separators provided herein retain good capacity and rate capabilities while also retaining good mechanical and/or safety characteristics, despite the less continuous morphology of the material. In certain instances, thicker separators are utilized, however, to achieve such results. In some embodiments, fiber mat separators provided herein have a thickness of about 15 micron to about 25 micron, such as about 20 micron.

In various embodiments, a separator, membrane, or thin film has an average thickness of about 25 micron (micrometer, μm) or less, such as about 1 micron to about 25 micron. In specific embodiments, the thickness is about 20 micron or less, such as about 1 micron to about 20 micron. In more specific embodiments, the thickness is about 5 micron to about 15 micron. In still more specific embodiments, the thickness is about 6 micron to about 12 micron. In other embodiments, the thickness is about 15 micron to about 25 micron, such as about 20 micron. In certain embodiments, thinner separators are preferred to allow more active material to be included in a battery, but performance characteristics, particularly safety parameters, should also be considered and/or met.

In certain embodiments, a separator, membrane, or thin film provided herein has a thickness variation of less than 20%. In preferred embodiments, the separator, membrane, or thin film provided herein has a thickness variation of less than 15%. In specific embodiments, the separator, membrane or thin film provided herein has a thickness variation of less than 10%. In more specific embodiments, the separator, membrane or thin film provided herein has a thickness variation of less than 5%. In various instances, low thickness variation materials are made possible by the processes provided herein. For example, in some instances, the use of gas-assisted electrospray techniques, such as provided herein, allow for the formation of fine aerosols that are uniformly distributed on a surface, such as to produce a material herein. In certain instances, such uniform deposition facilitates the formation of materials with very little thickness variation.

In certain instances, small pore sizes are desirable to avoid contact between negative and positive active electrode components. In general, such as in separators having a thickness of >20 micron, sub-micron pore sizes are sufficient to avoid contact between the negative and positive electrodes (which could cause short circuit, cell failure, fire, etc.). In certain instances, smaller pore sizes are desired for thinner separators, however, in order to reduce the chances of interaction between the two separators (e.g., due to use/distortion of the battery and separator, thermal distortion of the separator, smaller active electrode materials jutting into the pore—a small protrusion into the pore that may not be problematic with a thicker separator, could be problematic with a thinner separator, etc.).

In some embodiments, a separator, membrane, or thin film has a pore size distribution d95 of (i.e., wherein 95% of the pores, by number, have a size less than) about 1 micron or less. In specific embodiments, a separator, membrane, or thin film has a pore size distribution d98 of about 1 micron or less. In specific embodiments, a separator, membrane, or thin film has a pore size distribution d99 of about 1 micron or less. In more specific embodiments, a separator, membrane, or thin film has a pore size distribution d99.8 of about 1 micron or less. In still more specific embodiments, a separator, membrane, or thin film has a pore size distribution d99.9 of about 1 micron or less.

In certain embodiments, smaller pore sizes are provided in separators and materials, provided herein, such as in the polymer and polymer-ceramic hybrid film separators, particularly in cases wherein the separator/film/membrane is less than 20 micron thick. In some embodiments, a separator, membrane, or thin film has a pore size distribution d95 of about 0.5 micron or less. In specific embodiments, a separator, membrane, or thin film has a pore size distribution d98 of about 0.5 micron or less. In more specific embodiments, a separator, membrane, or thin film has a pore size distribution d99 of about 0.5 micron or less.

In certain embodiments, the separator, membrane, or thin film provided herein is mesoporous, such as having a median (d50) pore size of less than 0.2 micron (200 nm). In specific embodiments, the median (d50) pore size is less than 0.1 micron. In more specific embodiments, the median (d50) pore size is about 30 nm to about 60 nm.

In specific embodiments, provided herein is a porous laminate comprising a porous polymer film and at least one ceramic coating (e.g., continuous ceramic coating) on a surface thereof.

In some embodiments, a porous membrane (e.g., film) provided herein is at least 20% coated (e.g., by area) with a ceramic coating. In certain embodiments, the porous film is at least 40% coated (e.g., by area) with a ceramic coating. In specific embodiments, the porous film is at least 50% coated (e.g., by area) with ceramic coating. In more specific embodiments, the porous film is at least 60% coated (e.g., by area) with ceramic coating. In still more specific embodiments, the porous film is at least 80% coated (e.g., by area) with ceramic coating. In yet more specific embodiments, the porous film is at least 90% coated with ceramic coating.

In some embodiments, the porous membrane (e.g., film) has a first and second surface, at least 20% of either the first and/or second surface being coated with one or more ceramic coating. In certain embodiments, at least 40% of either the first and/or second surface is coated with one or more ceramic coating. In specific embodiments, at least 50% of either the first and/or second surface is coated with one or more ceramic coating. In more specific embodiments, at least 60% of either the first and/or second surface is coated with one or more ceramic coating. In still more specific embodiments, at least 80% of either the first and/or second surface is coated with one or more ceramic coating. In more specific embodiments, at least 90% of either the first and/or second surface is coated with one or more ceramic coating.

In some embodiments, the ceramic coating of a separator or material provided herein is a continuous coating (e.g., comprising a two-dimensional matrix on the surface of the porous polymer film, such as opposed to a plurality of ceramic particles which would be a plurality of zero dimensional ceramic materials having a non-continuous matrix). In certain embodiments, the ceramic coating comprises one or more continuous ceramic coating (e.g., having a continuous phase or matrix; e.g., as opposed to a film comprising collection of zero-dimensional, one-dimensional, or low aspect ratio particles).

In certain embodiments herein, any membrane, film, separator, fiber or porous material comprising a polymer material or matrix and having a surface thereof has at least a portion of the surface coated with ceramic (e.g., a non-particulate based and/or two-dimensional and/or continuous ceramic coating). In specific embodiments, at least 20% of the surface is coated with ceramic. In more specific embodiments, at least 40% of the surface is coated with ceramic. In still more specific embodiments, at least 60% of the surface is coated with ceramic. In yet more specific embodiments, at least 80% of the surface is coated with ceramic. In more specific embodiments, at least 90% of the surface is coated with ceramic. In still more specific embodiments, at least 95%, at least 98%, or at least 99% of the surface is coated with ceramic.

In various instances, good surface coverage of the polymeric material with ceramic provides for a number of benefits to a hybrid/composite material. For example, in some instances, good ceramic coverage improved ionic mobility of the material (e.g., and in turn rate capability and/or capacity of a battery comprising the same), wettability (e.g., reducing the need for excess electrolyte, e.g., reducing the cost and volume of the overall cell), improving mechanical properties (e.g., tensile strength in the medial (md) and/or transverse (td) directions) (e.g., improving processability, reducing probability of damage caused during use, and/or improving safety parameters), improving thermal stability (e.g., reducing shrinkage at elevated temperatures, e.g., improving safety parameters), and/or other beneficial characteristics.

In some embodiments, a membrane, separator, film, or the like provided herein comprising a polymer material or matrix comprises one or more ceramic domain embedded within the polymer matrix or material. In certain embodiments, the embedded ceramic domain(s) comprise discrete domains and/or continuous domains. In some embodiments, the domains embedded within the polymer are completely embedded within the polymer and/or extend to the surface of the polymer material/matrix (e.g., connecting with a surface ceramic coat). In certain embodiments, discrete domains are (e.g., isolated) zero dimensional or lower aspect ratio one-dimensional domains, such as having an aspect ratio of less than 10. In some embodiments, continuous domains are two-dimensional (e.g., coatings or shells) or higher aspect ratio (e.g., ≥10, >20, >50, >100, >1000, etc.) one-dimensional domains (e.g., embedded within a continuous polymer matrix material of a film or fiber, such as illustrated in FIG. 15).

As with surface ceramic coatings, in some instances, inclusion of embedded ceramic domains (e.g., continuous ceramic network) within the polymer matrix of a material provided herein provides for a number of benefits to a polymer-ceramic hybrid/composite material. For example, in some instances, ceramic embedded domains improve ionic mobility through the material (e.g., and in turn rate capability and/or capacity of a battery comprising the same), improve mechanical properties (e.g., tensile strength in the medial (md) and/or transverse (td) directions) (e.g., improve processability, reduce probability of damage caused during use, and/or improve safety parameters), improve thermal stability (e.g., reduce shrinkage at elevated temperatures, e.g., improve safety parameters), and/or other beneficial characteristics. In specific embodiments, a ceramic coat, along with embedded ceramic materials are preferred in materials provided herein. In some embodiments, the combination of both ceramic inclusions in the material provide for very high performance materials. In specific instances, inclusion of surface ceramic along with embedded ceramic domains greatly improves ionic conductivity of the separator/membrane/film, such as to facilitate excellent rate and capacity parameters of a material, even when materials with low porosity (e.g., about 40% or less) are utilized.

In some embodiments, polymer provided in a material (e.g., separator, membrane, film, fiber, mat, or the like) herein has a high degree of amorphous content. In specific embodiments, polymer provided in a material herein has is about 10 wt. % or more amorphous. In more specific embodiments, polymer provided in a material herein has is about 30 wt. % or more amorphous. In still more specific embodiments, polymer provided in a material herein has is about 50 wt. % or more amorphous. In certain instances, the embedded ceramic retards crystallization of the polymer (e.g., polymer matrix) material of a separator, membrane, film, etc. provided herein, such as during precipitation/solidification from a fluid stock during a process described herein (e.g., during concentrating, drying, and/or curing thereof). In some instances, low crystallinity of the polymer further facilitates performance characteristics of a material, such as ionic mobility, wettability, and/or the like of a material provided herein.

In various embodiments herein, any suitable amount of polymer and/or ceramic are utilized in the materials described herein. In specific embodiments, suitable amounts of polymer and ceramic are provided in the materials herein to achieve the morphologies described herein. In some embodiments, a material (e.g., separator, membrane, film, fiber mat, or the like) described herein comprises about 30 wt. % to about 99 wt. % polymer. In more specific embodiments, the material comprises about 40 wt. % to about 90 wt. % polymer. In still more specific embodiments, a material (e.g., a film or film separator) provided herein comprises about 50 wt. % to about 80 wt. % polymer. In some specific embodiments, a material (e.g., mat or mat separator) provided herein comprises about 70 wt. % to about 90 wt. % polymer (e.g., about 70 wt. % to about 85 wt. %). In some embodiments, a material (e.g., separator, membrane, film, fiber mat, or the like) described herein comprises about 1 wt. % to about 70 wt. % ceramic. In specific embodiments, the material comprises about 20 wt. % to about 50 wt. % ceramic. In some specific embodiments, a material (e.g., a film or film separator) provided herein comprises about 20 wt. % to about 50 wt. % (e.g., about 30 wt. % to about 50 wt. %) ceramic. In some specific embodiments, a material (e.g., mat or mat separator) provided herein comprises about 10 wt. % to about 30 wt. % ceramic (e.g., about 15 wt. % to about 30 wt. %). In certain embodiments, (fluid) stocks provided herein comprise ceramic precursor (relative to the total concentration of polymer and ceramic precursor) in comparable amounts.

In certain embodiments, a material (e.g., film or fiber) provided herein comprises a (e.g., continuous) polymer matrix with a ceramic coating, such as described herein. In specific embodiments, the ceramic coating has any suitable thickness to impart a beneficial characteristic(s) to the material, such as one of the many described herein. In some embodiments, the material has a (e.g., average) thickness (e.g., diameter of a fiber or thickness of a two-dimensional film), the polymer matrix (e.g., including any ceramic embedded therein) having a first thickness and the coating having a second thickness. In some instances, such as wherein a film is coated on both sides with ceramic or a fiber is coated all the way around the fiber, a material has a polymer thickness, a first coating thickness and a second coating thickness. In some embodiments, the (e.g., average) thickness of a ceramic coating is about 30% or less of the (e.g., average) thickness of material (e.g., separator, film, fiber, or the like). In specific embodiments, the (e.g., average) thickness of a ceramic coating is about 20% or less of the (e.g., average) thickness of material. In more specific embodiments, the (e.g., average) thickness of a ceramic coating is about 20% or less of the (e.g., average) thickness of material. In still more specific embodiments, the (e.g., average) thickness of a ceramic coating is about 15% or less of the (e.g., average) thickness of material. In yet more specific embodiments, the (e.g., average) thickness of a ceramic coating is about 8% to about 12% (e.g., about 10%) of the (e.g., average) thickness of material. In certain embodiments, the (e.g., average) thickness of the ceramic coating is at least 1% (e.g., at least 2%, at least 3%, at least 5%, or the like) of the overall (e.g., average) thickness of the material.

Any suitable polymer is utilized in the separators, membranes, films, fibers, mats, and the like described herein. In preferred embodiments, the polymer is a polymer compatible with one or more battery electrolyte, such as a lithium ion battery electrolyte. In certain embodiments, the polymer is polyvinyl alcohol (PVA), polyacrylonitrile (PAN), polyvinylidene difluoride (PVDF), polyvinylpyrrolidone (PVP), polyimide (PI), or a combination thereof. In specific embodiments, the polymer is PAN or PVDF.

Any suitable ceramic is utilized in the separators, membranes, films, fibers, mats, and the like described herein. In certain embodiments, the ceramic is a precursor derived ceramic, such as a ceramic derived from a ceramic precursor that is liquid or soluble in or (e.g., at least partially) miscible with water, aqueous solutions, alcohol, dimethylformamide (DMF), combinations thereof, or the like. In certain embodiments, the ceramic is a silicon based ceramic, such as a silicon-oxycarbonnitride (SiCNO) ceramic, a silicon-oxycarbide (SiCO) ceramic, a silicon-carbonnitride (SiCN) ceramic, a silicon-oxynitride (SiNO) ceramic, a silicon oxide (SiOx) ceramic, a silicon nitride (SiNx) ceramic, a silicon carbide (SiCx) ceramic, combinations thereof, or the like. In certain embodiments, the ceramic is a polymer derived ceramic (PDC), such as a ceramic derived from a polysilazane, a poly(organosilazane), a poly(organosilylcarbodiimide), a poly(organosiloxane), any combination thereof, or the like. In some embodiments, the ceramic is a sol-gel derived ceramic, such as a ceramic derived from silicic acid (e.g., orthosilicic acid, disilicic acid, metasilicic acid, pyrosilicic acid, or combinations thereof), or an alkylated derivative thereof, such as tetraethyl orthosilicate (TEOS), tetramethyl orthosilicate (TMOS), or the like. In various embodiments, other ceramics are derived from precursors such as silicon salts, such as silicon acetate, silicon chloride, or the like.

As discussed herein, separators, membranes, and films provided herein have very good performance characteristics, such as relative to typical commercial separators. For example, in certain embodiments, materials (e.g., separators, membranes, and films) provided herein have good wettability characteristics (e.g., which can reduce electrolyte cost, reduce the chance of electrolyte leakage, and/or reduce volume and/or weight of a cell, etc.). In certain embodiments, a material provided herein has an electrolyte uptake capacity of at least 3 times the mass of the material. In specific embodiments, a material provided herein has an electrolyte uptake capacity of at least 5 times the mass of the material. In more specific embodiments, a material provided herein has an electrolyte uptake capacity of at least 6 times the mass of the material. In still more specific embodiments, a material provided herein has an electrolyte uptake capacity of at least 7 times the mass of the material. In yet more specific embodiments, a material provided herein has an electrolyte uptake capacity of at least 8 times the mass of the material. On the other hand, some more conventional commercial separators have an electrolyte uptake capacity of less than 3 times the mass of the separator.

In certain embodiments, materials (e.g., separators, films, membranes) provided herein have good thermal stability. In some embodiments, materials have a shrinkage (e.g., in either or both the machine direction (md) and/or transverse direction) of less than 3% at 90° C. (e.g., after 1 hour). In specific embodiments, materials herein have a shrinkage of less than 2% at 90° C. (e.g., after 1 hour). in more specific embodiments, materials herein have a shrinkage of less than 1% at 90° C. (e.g., after 1 hour). In still more specific embodiments, materials herein have a shrinkage of less than 0.5% at 90° C. (e.g., after 1 hour). In yet more specific embodiments, materials herein have a shrinkage of less than 0.2% at 90° C. (e.g., after 1 hour). By contrast, typical commercial separator materials have shrinkages (in the machine direction) of about 5% or greater at 90° C. For example, CELGARD® 2325 (25 micron microporous trilayer membrane (PP/PE/PP)) has an MD shrinkage at 90° C. of 5% after 1 hour, CELGARD® 2340 (38 micron microporous trilayer membrane (PP/PE/PP)) has an MD shrinkage at 90° C. of 7% after 1 hour, and CELGARD® 2400 (25 micron microporous monolayer membrane (PP)) has an MD shrinkage at 90° C. of 5% after 1 hour. In some embodiments, materials have a shrinkage (e.g., in either or both the machine direction (md) and/or transverse direction) of less than 20% at a temperature of at least 200° C. (e.g., after 1 hour). In specific embodiments, materials herein have a shrinkage of less than 15% at a temperature of at least 200° C. (e.g., after 1 hour). in more specific embodiments, materials herein have a shrinkage of less than 10% at a temperature of at least 200° C. (e.g., after 1 hour). In still more specific embodiments, materials herein have a shrinkage of less than 5% at a temperature of at least 200° C. (e.g., after 1 hour). In yet more specific embodiments, materials herein have a shrinkage of less than 3% at a temperature of at least 200° C. (e.g., after 1 hour). In more specific embodiments, materials herein have a shrinkage of less than 2% at a temperature of at least 200° C. (e.g., after 1 hour).

In certain embodiments, a material (e.g., separator, membrane, or film) provided herein has a strain of less than ±20% (i.e., between −20% and +20% (shrinkage and expansion)) at a temperature of at least 200° C. and a controlled force of 0.001 N (e.g., in longitudinal (md) and/or transverse directions (td)). In specific embodiments, the material has a strain of less than ±10% at a temperature of at least 200° C. and a controlled force of 0.001 N (e.g., in longitudinal (md) and/or transverse directions (td)). In more specific embodiments, the material has a strain of less than ±5% at a temperature of at least 200° C. and a controlled force of 0.001 N (e.g., in longitudinal (md) and/or transverse directions (td)). In still more specific embodiments, the material has a strain of less than ±3% at a temperature of at least 200° C. and a controlled force of 0.001 N (e.g., in longitudinal (md) and/or transverse directions (td)). In yet more specific embodiments, the material has a strain of less than ±2% at a temperature of at least 200° C. and a controlled force of 0.001 N (e.g., in longitudinal (md) and/or transverse directions (td)).

In certain embodiments, the materials (e.g., separator, membrane, or film) provided herein have good air permeability (e.g., demonstrating good fluid flow characteristics thereof). In some embodiments, the materials have an air flow rate (e.g., therethrough) of at least 10 mL/s at a differential pressure of 35 pounds per square inch (psi). In specific embodiments, the materials have an air flow rate (e.g., therethrough) of at least 20 mL/s at a differential pressure of 35 psi. In more specific embodiments, the materials have an air flow rate (e.g., therethrough) of at least 30 mL/s at a differential pressure of 35 psi. In still more specific embodiments, the materials have an air flow rate (e.g., therethrough) of at least 40 mL/s at a differential pressure of 35 psi.

Also provided in certain embodiments herein are energy storage devices comprising a material (e.g., separator, membrane, or film) described herein. In certain embodiments, an energy storage device (e.g., battery, such as a lithium battery, e.g., lithium ion battery) comprises a first electrode (e.g. positive electrode), a second electrode (e.g., a negative electrode), and a separator described herein. In specific embodiments, the separator is positioned between (e.g., as a physical barrier) between the first and second electrode. In specific embodiments, the energy storage device further comprises an electrolyte (e.g., the separator being wetted with the electrolyte).

In certain embodiments, energy storage devices proved herein have very good rate capabilities (e.g., that retain good and reversible energy storage capacities, even at fast charge rates). In some embodiments, the capacity of a battery provided herein at a charge rate of at least 2 C (complete charge in ½ hour) is at least 70% of the capacity at a charge rate of 1 C (complete charge in 1 hour) or less. In specific embodiments, the capacity of a battery provided herein at a charge rate of at least 2 C (complete charge in ½ hour) is at least 80% of the capacity at a charge rate of 1 C (complete charge in 1 hour) or less. In more specific embodiments, the capacity of a battery provided herein at a charge rate of at least 2 C (complete charge in % hour) is at least 90% of the capacity at a charge rate of 1 C (complete charge in 1 hour) or less. In some embodiments, the capacity of a battery provided herein at a charge rate of at least 3 C (complete charge in ⅓ hour) is at least 70% of the capacity at a charge rate of 1 C (complete charge in 1 hour) or less. In specific embodiments, the capacity of a battery provided herein at a charge rate of at least 3 C (complete charge in ⅓ hour) is at least 80% of the capacity at a charge rate of 1 C (complete charge in 1 hour) or less. In more specific embodiments, the capacity of a battery provided herein at a charge rate of at least 3 C (complete charge in ⅓ hour) is at least 85% of the capacity at a charge rate of 1 C (complete charge in 1 hour) or less. In some embodiments, the capacity of a battery provided herein at a charge rate of at least 4 C (complete charge in ¼ hour) is at least 65% of the capacity at a charge rate of 1 C (complete charge in 1 hour) or less. In specific embodiments, the capacity of a battery provided herein at a charge rate of at least 4 C (complete charge in ¼ hour) is at least 75% of the capacity at a charge rate of 1 C (complete charge in 1 hour) or less. In more specific embodiments, the capacity of a battery provided herein at a charge rate of at least 4 C (complete charge in ¼ hour) is at least 80% of the capacity at a charge rate of 1 C (complete charge in 1 hour) or less. In certain embodiments, such rate capabilities are reversible, such as for at least 5 cycles, at least 10 cycles, at least 20 cycles, at least 50 cycles, or the like. In certain embodiments, a rate described herein is reversible if it can be repeated for at least 5 cycles, at least 10 cycles, at least 20 cycles, or the like, followed by at least 5 cycles at a rate of C/10.

As discussed herein, in some instances, separator materials provided herein have good rate capabilities, despite having relatively low porosity values. In some instances, good rate capability is facilitated by excellent coverage and/or embedding of continuous ceramic material onto and/or into the separator materials. In some instances, the continuous nature of the ceramic material on and/or through the separator material facilitates good (e.g., lithium) ionic conductivity along the surface of and/or through the separator material. In some instances, such improved surface and through-separator conductivity facilitates improved rate capabilities of a battery system comprising such a separator, even when lower porosity separator materials are utilized (though low porosity separator materials are not required). In some instances, non-continuous ceramic materials fail to provide such an effect (or of such a magnitude) because the breaks in continuity of the high ionic conductivity ceramic materials retard ionic conductivity along the ceramic material (be it along the surface (e.g., as a continuous coating or shell) of the separator material and/or embedded (e.g., as a co-continuous embed material) within the separator).

In some embodiments, provided herein is a process of charging or discharging a battery, the process comprising:
  a. providing a battery cell comprising a negative electrode, a positive electrode, and a separator, the separator being positioned between the negative electrode and the positive electrode, and the separator comprising a porous body, the porous body comprising a plurality of pores and a solid body (e.g., any separator or membrane described herein, such as wherein the solid body comprising a film or fibers comprising a continuous polymer and a continuous ceramic, such as a continuous embed within the continuous polymer and/or a continuous shell on the surface of the continuous polymer);
  b. charging or discharging the battery cell, whereby ions (e.g., lithium ions) flow from the positive electrode to the negative electrode or from the negative electrode to the positive electrode, the ions passing (i) through the plurality of pores of the porous body, and (ii) along the surface of the solid body and/or through the solid body.

In some instances, improved rate capabilities of such battery cells are obtained, such as described herein. In certain embodiments, at a given rate (e.g., 0.5 C, 1 C, 2 C, 3 C, or the like), the capacity of a battery cell comprising a separator comprising a continuous ceramic, such as described herein is at least 1.1 times, at least 1.2 times, at least 1.3 times, at least 1.5 times, at least 2 times, or the like of the capacity observed in an otherwise identical material lacking the continuous ceramic. In some instances, as charge and/or discharge rates increase, lower capacity is observed as some of the ions do not have a sufficient chance to transfer from one electrode to another due to the insufficient ionic conductivity of the separator material. In certain instances, with the increase ionic conductivity along the surface of and/or through the separators provided herein, improved rate capabilities are observed (e.g., the battery not only continuous to function at higher rates, but good capacities are observed at higher rates).

Provided in certain embodiments herein are process for manufacturing materials (e.g., separators, membranes, films, fibers, mats, or the like) described herein. In some embodiments, the process comprises gas-assisted ejection of a fluid stock from a conduit. In specific embodiments, the conduit is a part of a gas-assisted nozzle, the conduit comprising an inlet and an outlet and the gas assisted nozzle configured to provide a high velocity gas at or near the outlet of the conduit. In certain embodiments, the nozzle is configured to receive a voltage, such as to facilitate electrospinning and/or electrospraying of a fluid stock therethrough.

In some embodiments, provided herein is a process for manufacturing a material herein (e.g., a polymer-ceramic hybrid membrane), the process comprising injecting a fluid stock into a (e.g., high velocity) gas stream. In some embodiments, the fluid stock comprises a polymer and a liquid medium. In certain embodiments, the fluid stock comprises polymer, a liquid medium, and a sacrificial polymer. In some embodiments, the fluid stock comprises a polymer, a liquid medium, and a ceramic precursor. In specific embodiments, the fluid stock comprises a polymer, a liquid medium, a sacrificial polymer, and a ceramic precursor. In certain embodiments, the process comprises providing an electrostatic charge to the fluid stock prior to injecting the fluid stock into the gas stream.

In specific embodiments, provided herein is a method for manufacturing a material (e.g., separator or membrane) herein, the process comprising:
  a. providing the fluid stock to a first inlet of a first conduit of a nozzle apparatus, the first conduit being enclosed along the length of the first conduit by a first wall having an interior surface and an exterior surface, the first conduit having a first outlet;
  b. providing a gas to a second inlet of a second conduit of the nozzle apparatus, the second conduit being enclosed along the length of the second conduit by a second wall having an interior surface, the second conduit having a second outlet, and at least a portion of the second conduit being positioned along and/or in at least partially surrounding relation to the first conduit;
  c. collecting a composition (e.g., the aforementioned separator or membrane or a precursor thereof) on a substrate.

In some embodiments, a high velocity gas is provided at the second outlet (e.g., as a result of pressured gas being provided to the second inlet. Any suitable pressure of gas or velocity of gas is utilized. In specific embodiments, the velocity of the gas at the second outlet is at least 0.5 m/s (e.g., at least 5 m/s).

In certain embodiments, the second conduit is positioned along and/or in at least partially surrounding relation to the first conduit proximal to the first and/or second outlets (e.g., the segment of the first conduit proximal to the first outlet). In certain embodiments, the second conduit uniformly surrounds the first conduit for at least a portion of the length of the first conduit. In some embodiments, the second conduit non-uniformly surrounds the first conduit—such as wherein the second conduit is offset or segmented.

In certain embodiments, a voltage is applied to the nozzle apparatus. In specific instances, a voltage is applied to the nozzle apparatus, such as the fluid stock is electrostatically charged upon ejection.

In some instances, the fluid stock is provided to multiple nozzle apparatuses. In various embodiments, the multiple nozzle apparatuses are provided in a single nozzle bank or manifold, such as in linear, offset, circular, and/or other configurations.

In some specific embodiments, a material (e.g., membrane or separator provided herein) is prepared by:
  a. electrostatically charging a fluid stock;
  b. injecting the fluid stock into a gas stream (e.g., using a nozzle apparatus configured to inject the fluid stock into the gas stream); and
  c. collecting a composition (e.g., the aforementioned separator or membrane or a precursor thereof) on a substrate.

In some embodiments, a nozzle used in a process herein is an electrospin or an electrospray nozzle. In certain embodiments, similar nozzle types can be utilized, with the concentration of polymer determining whether a membrane produced thereby is a fiber mat or a thin film. In specific instances, a lower concentration of polymer (e.g., about 0.1 wt. % to about 10 wt. %, or about 1 wt. % to about 5 wt. %, depending on the polymer, the molecular weight thereof, and the like) in the fluid stock produces a fine aerosol, which in turn produces a thin film membrane, whereas a higher concentration (e.g., about 1 wt. % to about 50 wt. %, or about 5 wt. % to about 20 wt. %, depending on the polymer, the molecular weight thereof, and the like) in polymer in the fluid stock produces a fibrous jet, which in turn produces a fibrous mat membrane. In some instances, upon ejection of a fluid stock from a nozzle (e.g., a first outlet thereof), an aerosol or plume is provided. In specific instances, the aerosol or plume comprises a plurality of plume particles (e.g., comprising "wet" droplets comprising a liquid medium—some of which may have evaporated—and/or dried particles wherein the liquid medium is completely evaporated). Generally, the gas-assisted processes herein provide for the production of fine aerosols, with good uniformity of the particle sizes thereof. In some instances, good dispersion of the fine particles allows for the formation of highly uniform films. In specific instances, such features further facilitate the partial and/or complete phase separation of polymer and ceramic/ceramic precursor in the product materials. In some specific instances, such processes and features described herein (e.g., small domains of the small droplets/particles of a fine aerosol herein) facilitate the "self-assembly" of the coated materials and/or laminates described herein (e.g., due to differentials in affinities, surface tensions, or other characteristics of the components parts (e.g., polymers, precursors, liquid medium, etc.)). In addition, in some instances, production of the small domains of the droplets provided herein and/or the high-speed gas flow of the processes herein, rapid curing of ceramic precursors is facilitated according to processes herein—in some instances, even at low or even room temperature conditions. In some preferred embodiments, curing is slow enough to allow formation of continuous ceramic structures within the membrane (e.g., film), or component thereof (e.g., fiber(s) thereof). Further, in some instances, deposition of semi-wet (e.g., wherein some, but not all, of the liquid medium is evaporated from the particles/droplets during spraying) membranes (films) herein facilitate the production of porous (e.g., mesoporous) domains within the membrane (film), such as to produce a membrane having a desired porosity, such as provided herein.

In specific embodiments, the plurality of plume particles within d/4 of the substrate having an average dimension of about 1 micron or less, wherein d is the shortest distance between the first outlet of the nozzle and the substrate However, other advantageous aerosol features are described in various embodiments herein.

Various other configurations of the systems provided for performing the processes herein are also contemplated. For example, in some instances, provided herein is a process wherein the substrate surface is in opposing relation to the nozzle (e.g., first and second outlets thereof). In certain embodiments, such as wherein high-throughput commercial applications are contemplated, the process is a roll-to-roll process (e.g., wherein a rolled substrate is unrolled to be presented opposite the nozzle, and then re-rolled with a membrane deposited thereon). In other words, in some instances, the substrate is affixed to a roll-to-roll conveyor system.

Any suitable nozzle configuration is also contemplated herein. For example, in some embodiments, the conduit gap (e.g., the average distance between the inner and outer wall of the second conduit, such as on a line drawn from the center of the first conduit and extending outward through the second conduit that at least partially surrounds the first conduit) is about 0.05 mm to about 30 mm. In specific embodiments, the conduit gap is about 0.05 mm to about 20 mm. In more specific embodiments, the conduit gap is about 0.1 mm to about 10 mm. In certain embodiments, a gas stream is provided or ejected from the nozzle in a similar direction or along a common axis with the direction/axis upon which the fluid stock is ejected from the nozzle (e.g., within 15 degrees, within 10 degrees, within 5 degrees, within 3 degrees, or the like). In specific embodiments, the inner surface of the outer walls defining the first and second conduit are within 15 degrees of parallel of one another for at least a portion of the length of the first and second conduits ((e.g., the length of the portion of the nozzle wherein the first and second conduits are within 15 degrees (e.g., within 10 degrees, within 5 degrees, or the like) of parallel of one another being the conduit overlap length). In particular, such common directionality is provided in the segment of the conduits proximal to the first and/or second outlet and/or the nozzle terminus. In certain embodiments, the ratio of the conduit overlap length (e.g., the overlap length being the length of the overlap segment having common directionality and located proximal to the first and/or second outlet) to the first diameter is about 1 or more (e.g., about 2 or more, about 3 or more, about 5 or more, about 1 to about 10). In more general instances, upon ejection of the fluid stock from the nozzle or injection of the fluid stock into the gas stream, a jet is formed from the fluid stock, the high velocity gas or the gas stream at least partially surrounding the jet.

Any suitable components are utilized in the processes and fluid stocks provided herein. In particular, in some embodiments, a polymer utilized herein is polyvinyl alcohol (PVA), polyacrylonitrile (PAN), polyvinylidene difluoride (PVDF), polyvinylpyrrole (PVP), polyimide (PI) or a combination thereof. In certain embodiments, a ceramic precursor is a precursor of a silicon based ceramic (e.g., SiCNO, SiCO, SiCN, SiNO, SiO ceramics). In specific embodiments, the ceramic precursor is a polymer derived ceramic (PDC) precursor (e.g., polysilazane, poly(organosilazanes), poly (organosilylcarbodiimides), polysiloxanes, and poly(organosiloxanes)). In specific embodiments, the ceramic precursor is a polysilazane (e.g., a poly(organosilazane)). Other exemplary polymer derived ceramics include, by way of non-limiting example, those described in US Patent Pub Nos. 2016/0280607, 2014/0343220, 2014/0326453, 2015/ 0175750, 2008/0095942, 2008/0093185, 2006/0069176, 2006/0004169 and U.S. Pat. Nos. 8,742,008, 7,714,092, 7,087,656, 5,153,295, and 4,657,991, amongst others, which references are incorporated herein for such precursors and polymer derived ceramics. In some embodiments, the ceramic precursor is a siloxane (e.g., a poly(organosiloxane), methylsiloxane (MSX)). In certain embodiments, the ceramic precursor is a silsesquioxane (e.g., methyl silsesquioxane (MSQ), a polysilesquioxane (PSSQ), a poly (organosilsesquioxane), or a polyhedral oligomeric silsesquioxane (POSS)). In some embodiments, the ceramic is a sol-gel precursor (e.g., a silicate, such as silicic acid, TMOS, TEOS). In some embodiments, any combination of such ceramic precursors are also contemplated herein.

In certain embodiments, a membrane, a fluid stock, or a process provided herein comprises or comprises using a sacrificial polymer. In some instances, inclusion of a sacrificial polymer facilitates formation of domains within a resulting material (e.g., membrane, film, or the like) comprising such sacrificial polymer. In certain embodiments, a process herein comprises using a fluid stock comprising a sacrificial polymer. In further embodiments, a process herein comprises removing the sacrificial polymer following deposition of a composition or membrane provided herein. In some instances, the sacrificial polymer "self-assembles" into small (e.g., sub-micron) domains within a composition or material provided herein, e.g., whereupon removal of the sacrificial polymer results in the formation of porous domains within the composition or material (e.g., membrane, film). Any suitable method for removing the sacrificial polymer is optionally utilized. In specific embodiments, removing of the sacrificial polymer from the composition comprises washing the composition with a solvent in which the sacrificial polymer is (e.g., selectively) soluble and/or thermally treating the membrane to (e.g., selectively) degrade the sacrificial polymer. Any suitable sacrificial polymer is optionally utilized (e.g., and is different from the non-sacrificial polymer). In specific embodiments, the sacrificial polymer is PEO, PVA, PVP.

In various embodiments, provided herein are membranes, films, fiber mats, and the like, such as described herein, wherein the ceramic is a ceramic precursor, such as a ceramic precursor described herein, or a partially cured intermediate of a ceramic resulting therefrom. Further, in some embodiments, provided herein are membranes, films, fiber mats, and the like comprising a sacrificial polymer, such as described herein. In some embodiments, such materials comprise domains (e.g., discrete) comprising such sacrificial polymer. In certain embodiments, such materials are porous materials comprising polymer (e.g., sacrificial polymer, such as described herein) configured or charged within the porous cavities thereof. In some instances, the porous cavities are at least partially or completely filled with such polymer (e.g., sacrificial polymer). In certain embodiments, porous membranes (e.g., films) provided herein have electrolyte charged or configured within the pores thereof (e.g., at least partially or completely filling the porous voids of the membrane).

In certain embodiments, a process provided herein comprises collecting a semi-wet composition (e.g., film). In certain embodiments, the semi-wet composition comprises about 10 wt. % or less (e.g., about 0.1 wt. % to about 10 wt. %) of a liquid medium. In specific embodiments, the semi-wet composition comprises about 1 wt. % to about 5 wt. % of a liquid medium. In some instances, the semi-wet composition is dried to form a porous membrane, such as provided herein. In some embodiments, during processing, a majority of the liquid medium is evaporated, with a small remainder being deposited in the resulting composition. In certain embodiments, the process herein provides good plume uniformity and good deposition uniformity, resulting in the formation of small domains of liquid medium formed in a composition/deposition, which, in some instances, facilitates the formation of a porous membrane comprising sub-micron pores (e.g., mesoporous structures).

In certain embodiments, a ceramic precursor utilized herein is cured during processing to form a ceramic, such as described herein. In some embodiments, however, additional curing is desired or required. In certain embodiments, a process provided herein further comprises curing a composition herein, such as to provide a material (e.g., membrane, film, fiber mat, or the like) provided herein. In certain embodiments, curing is temperature curing (e.g., heating to about 50 C to about 200 C), chemical curing, and/or the like. In certain instances, ceramic precursor materials provided and utilized herein typically require long and/or high temperature curing; however, with the processes herein, wherein the jets/droplets are exposed to high volumes of air over low surface areas, such cure times and/or temperatures are greatly reduced. In certain instances, the ceramic precursor of the composition as collected is already cured to a ceramic, or is cured with relatively small time or temperature.

In addition, provided herein are the various compositions prepared by, preparable by, or otherwise described in the processes herein. In some instances, provided herein are films, plumes or aerosols, fluid stocks, systems comprising any one or more of the same, and the like described herein.

These and other objects, features, and characteristics of the system and/or process disclosed herein, as well as the processes of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of “a”, “an”, and “the” include plural referents unless the context clearly dictates otherwise. In addition, unless otherwise stated, values and characteristics described for individual components herein also include disclosure of such values and characteristics as an average of a plurality (i.e., more than one) of such components. Similarly, disclosure of average values and characteristics herein also includes a disclosure of an individual value and characteristic as applied to a single component herein.

In certain instances, a value “about” an indicated value is a value suitable for achieving a suitable result and/or a result similar as achieved using the identified value. In some instances, a value “about” an indicated value is between ½ and 2 times the indicated value. In certain instances, a value “about” an indicated value is ±50% the indicated value, ±25% the indicated value, ±20% the indicated value, ±10% the indicated value, ±5% the indicated value, ±3% the indicated value, or the like.

In some instances, a “continuous” component provided herein is a component that runs uninterrupted or without break through or along at least a portion of a material (e.g., film or fiber) provided herein. In various instances, a continuous component of a material (e.g., film or fiber) provided herein may be a continuous substrate, film or core component (e.g., polymer component) and/or a continuous coating or shell material (e.g., ceramic or ceramic precursor component). In general, a continuous substrate, film, matrix, or core component (e.g., polymer) is present along or over a significant area or length of the material (e.g., film or fiber) (which continuous component, if a core or substrate component, may not be present on the surface of the material due to the presence of a coat or shell), such as at least 50%, at least 75%, at least 80%, at least 90%, at least 95%, at least 98%, or the like of the material. In certain instances, a continuous embed, coat, or shell component (e.g., ceramic) is present along or over a significant area or length of the material (e.g., film or fiber) (which continuous component, if an embed component, may not be present on the surface of the material due to the presence of a matrix, coat and/or shell), such as at least 10%, at least 20%, at least 30%, at least 50%, at least 75%, at least 80%, at least 90%, at least 95%, at least 98%, or the like of the material. In certain embodiments, co-continuous materials are provided herein, such as wherein the co-continuous comprise a continuous matrix material (such as a continuous polymer matrix material), and a continuous embed material (e.g., ceramic), wherein the continuous embed material is configured within the continuous matrix material. In some instances, co-continuous materials further comprise a coating, such as a continuous coating material (e.g., ceramic). In some instances, the coating material covers all or part of the continuous matrix material, such as in amounts described herein. In some instances, the continuous embed material is connected with (e.g., continuous with) the continuous coating material.

Fibers provided herein have any suitable average diameter, such as nanofibers having an average diameter of less than 5 micron (micrometer), less than 2 micron, less than 1,000 nm, or the like.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1 illustrates high speed imaging of electrospray of a fluid stock using non-gas assisted electrospray techniques (left panel) and an exemplary gas controlled electrospray technique provided herein (right panel).

FIG. 2 illustrates depositions manufactured by an exemplary conventional electrospray techniques (left panels) and an exemplary gas controlled electrospray process provided herein (right panels).

FIG. 3 illustrates an exemplary system provided herein comprising a bank of electrospray nozzles positioned opposite a substrate.

FIG. 4 shows an exemplary illustration of a gas controlled electrospray system provided herein and an exemplary illustration of a non-gas controlled electrospray system.

FIG. 5 illustrates an exemplary silazane structure having a plurality of cyclic and chain structures.

FIG. 6 illustrates an exemplary silsesquioxane cage structure.

FIG. 7 illustrates an exemplary silsesquioxane opened cage structure.

FIG. 8 illustrates exemplary electrospray nozzle apparatuses provided herein.

FIG. 9 illustrates exemplary monomeric units of a polysilazanes provided herein.

FIG. 10 illustrates wettability of an exemplary polymer-ceramic hybrid membrane material provided herein relative to a commercial polyolefinic separator.

DETAILED DESCRIPTION OF THE INVENTION

Provided in certain embodiments herein are membranes, films (e.g., thin films), fiber mats, separators, and precursors thereof. Also provided herein are processes and systems for manufacturing the same. In some embodiments, processes and systems provided herein are suitable for and configured to manufacture uniform membranes and separators, such as having uniform thickness.

Provided in certain embodiments herein are membranes and separators, as well as precursors thereof. In general, such materials are thin membrane materials, such as having a thickness of less than 50 micron (e.g., 5-25 micron). In certain embodiments, the membranes and separators herein comprise a porous membrane material. In certain embodiments, the porous membrane generally has sub-micron sized pores, such as having an average or median (d50) pore size of less than 100 nm (e.g., about 30 nm to about 60 nm). In addition, in some embodiments, maximum pore sizes provided herein (e.g., d95, d98, d99, or the like) are generally sub-micron (e.g., less than 1 micron, or smaller, such as less than 0.6 micron, less than 0.5 micron, or the like). In various embodiments, a membrane or separator herein comprises a polymer-ceramic hybrid or composite material, such as a film or fiber (e.g., a membrane herein comprising a mat of fibers) comprising such as polymer-ceramic material. In various embodiments, the polymer-ceramic material comprises a polymer matrix material that is at least partially coated or encapsulated with a ceramic. In further or additional embodiments, the polymer matrix comprises ceramic domains embedded therewithin.

Figure 10:
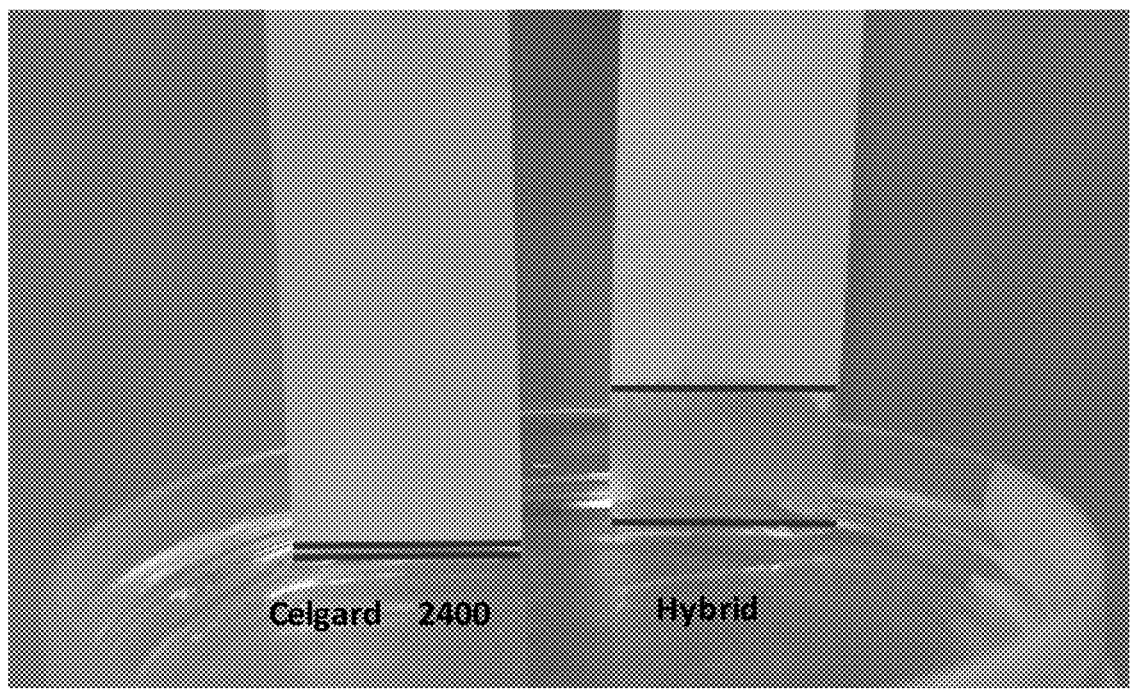
Figure 11:
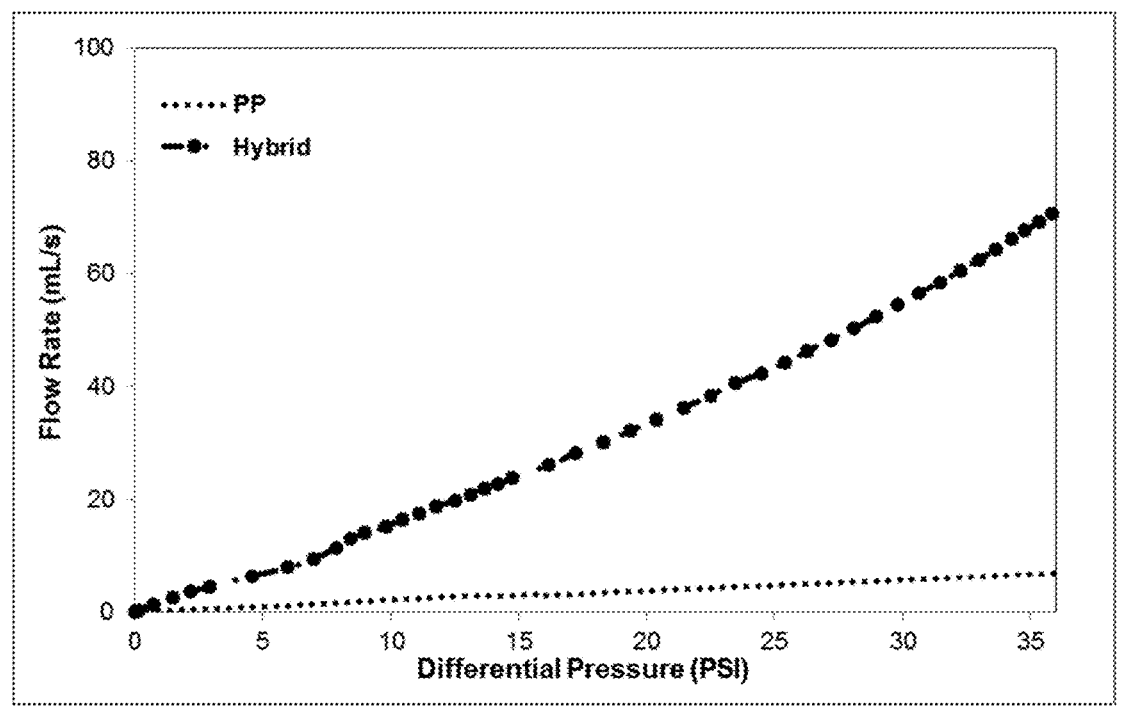
FIG. 11 illustrates permeability of an exemplary polymer-ceramic hybrid membrane material provided herein relative to a commercial polyolefinic separator.
Figure 12:
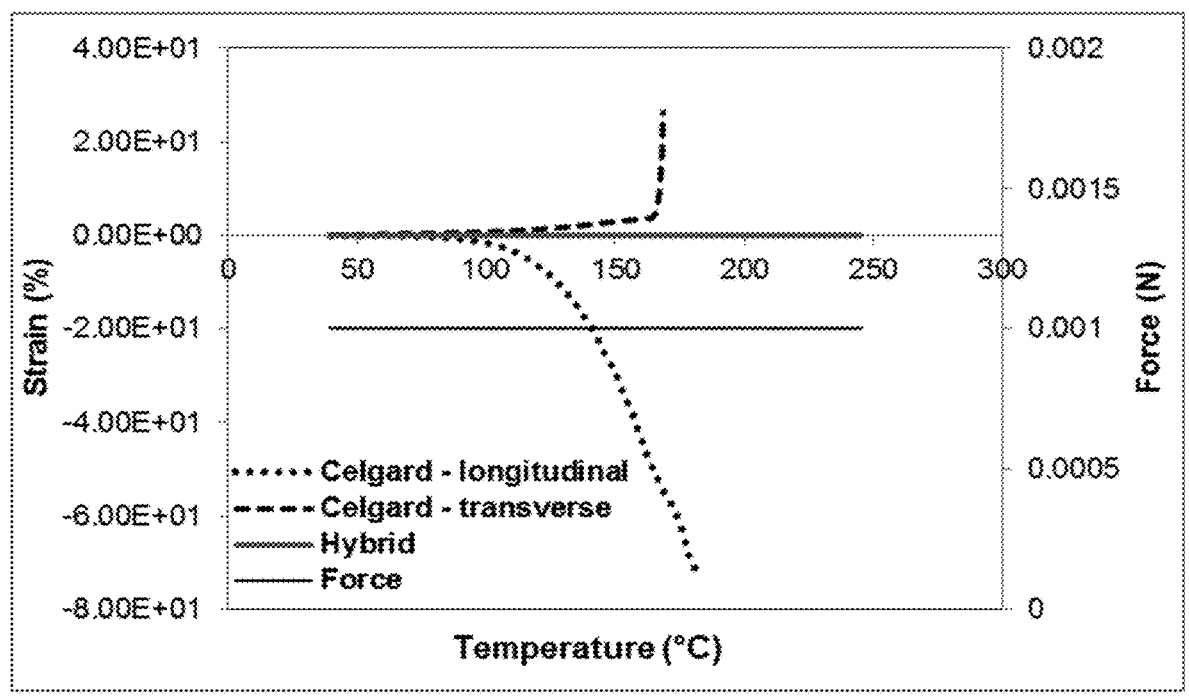
FIG. 12 illustrates thermal stability of an exemplary polymer-ceramic hybrid membrane material provided herein relative to a commercial polyolefinic separator.

In some embodiments, membranes, separators and separator materials provided herein have good or improved mechanical performance characteristics (e.g., decreases failure rate during compression and/or overheating), rate capabilities (e.g., increases rate of charging), safety profiles (e.g., good thermal stability, reduced fail rate, etc.), wettability (e.g., which further reduces the amount of non-active material required in a battery), and other features, such as relative to commercial materials. In certain instances, separators and separator materials provided herein achieve such characteristics while also being thinner than typical commercial separators (e.g., <25 micron, or thinner). For example, FIG. 10 illustrates the dramatically improved wettability of an exemplary polymer-ceramic hybrid membrane material provided herein relative to a polypropylene (PP) separator by CELGARD®. As is demonstrated, polymer-ceramic hybrid membrane provided herein have been observed to have exceptional electrolyte wicking capabilities (corresponding to wettability) relative to more conventional polyolefinic separator membranes. In addition, FIG. 11 illustrates the enhanced fluid permeability of an exemplary polymer-ceramic hybrid membrane material provided herein relative to a polyolefinic separator by CELGARD®. As is demonstrated, polymer-ceramic hybrid membrane provided herein have been observed to have exceptional permeability capabilities relative to more conventional polyolefinic separator membranes. Likewise, FIG. 12 illustrates the enhanced thermal stability of an exemplary polymer-ceramic hybrid membrane material provided herein relative to a polyolefinic separator by CELGARD®. As is demonstrated, polymer-ceramic hybrid membrane provided herein have been observed to have exceptional thermal stability up to 200° C. and beyond, whereas more conventional polyolefinic separator membranes rapidly fail at temperatures below even 100° C.

Figure 13:
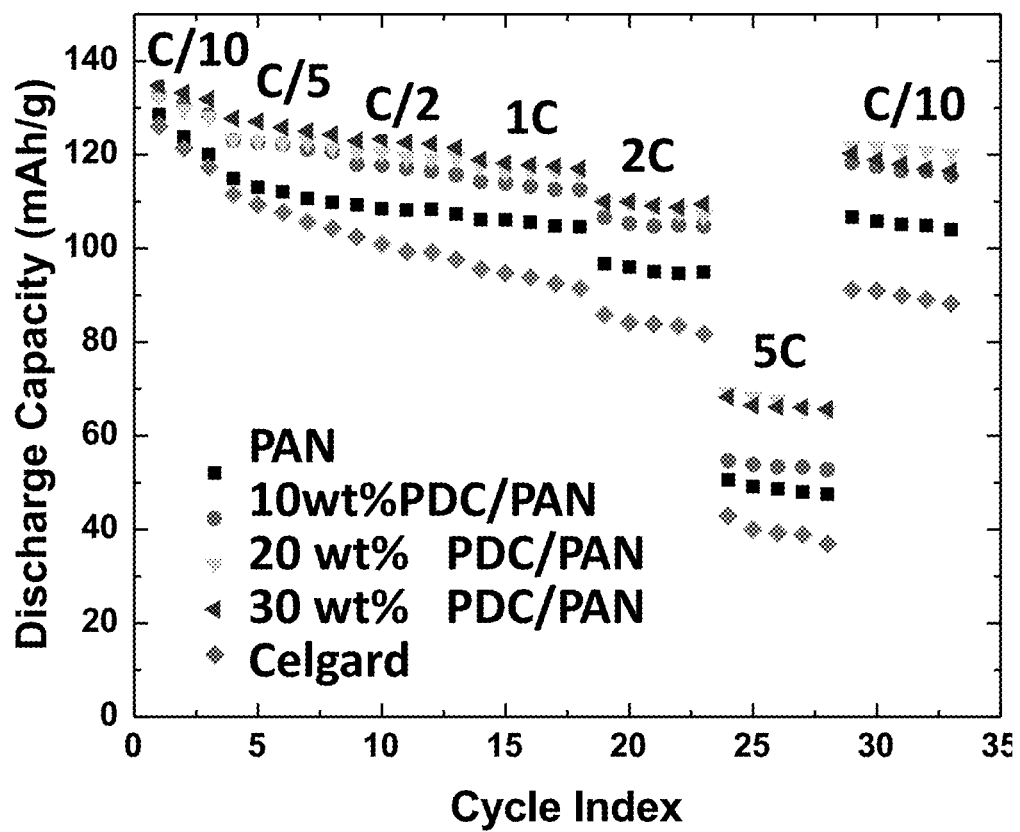
FIG. 13 illustrates capacities and rate capabilities of various membranes provided herein relative to a commercial polyolefinic separator.

FIG. 13 illustrates capacities and rate capabilities of various exemplary membranes provided herein relative to a commercial polyolefinic separator. As demonstrated, each of the membranes provided herein provides improved capacities and and rate capabilities over more conventional polyolefinic separator membranes. In addition, while doubling the porosity of the polymer-only (PAN) (fibrous mat) membrane relative to the CELGARD® (polyolefin) membrane (from a porosity of about 40% for the CELGARD® to about 80% for the PAN), the capacity and rate capabilities only slightly improved. Significant improvements were observed for the polymer-ceramic hybrid membranes (having similar porosity as the PAN membranes), however, with the most marked benefits being observed for those with higher concentrations of ceramic content in the polymer-ceramic hybrid materials (with a ceramic content of about 20% providing the best performance of the materials exemplified). As is seen, polymer-PDC membranes demonstrate improved rate capabilities compared to PAN membranes and CELGARD® membranes. In some instances, good ceramic surface coverage and/or inclusion of ceramic domains within a polymer matrix provide advantageous ionic conductivity and wetting enhancements in separator membranes, such as illustrated herein. For example, ionic conductivity is about 0.22 mS/cm for the CELGARD® material, about 0.29 mS/cm for the PAN membrane, about 0.51 mS/cm for the PAN-PDC (10 wt. %) membrane, about 0.80 mS/cm for the PAN-PDC (20 wt. %) membrane, and about 1.14 mS/cm for the PAN-PDC (30 wt. %) membrane.

In certain embodiments, a membrane or separator provided herein has an ionic conductivity of about 0.3 mS/cm or more. In specific embodiments, a membrane or separator provided herein has an ionic conductivity of about 0.5 mS/cm or more. In more specific embodiments, a membrane or separator provided herein has an ionic conductivity of about 0.8 mS/cm or more (e.g., about 0.8 mS/cm to about 1.5 mS/cm).

Figure 14:
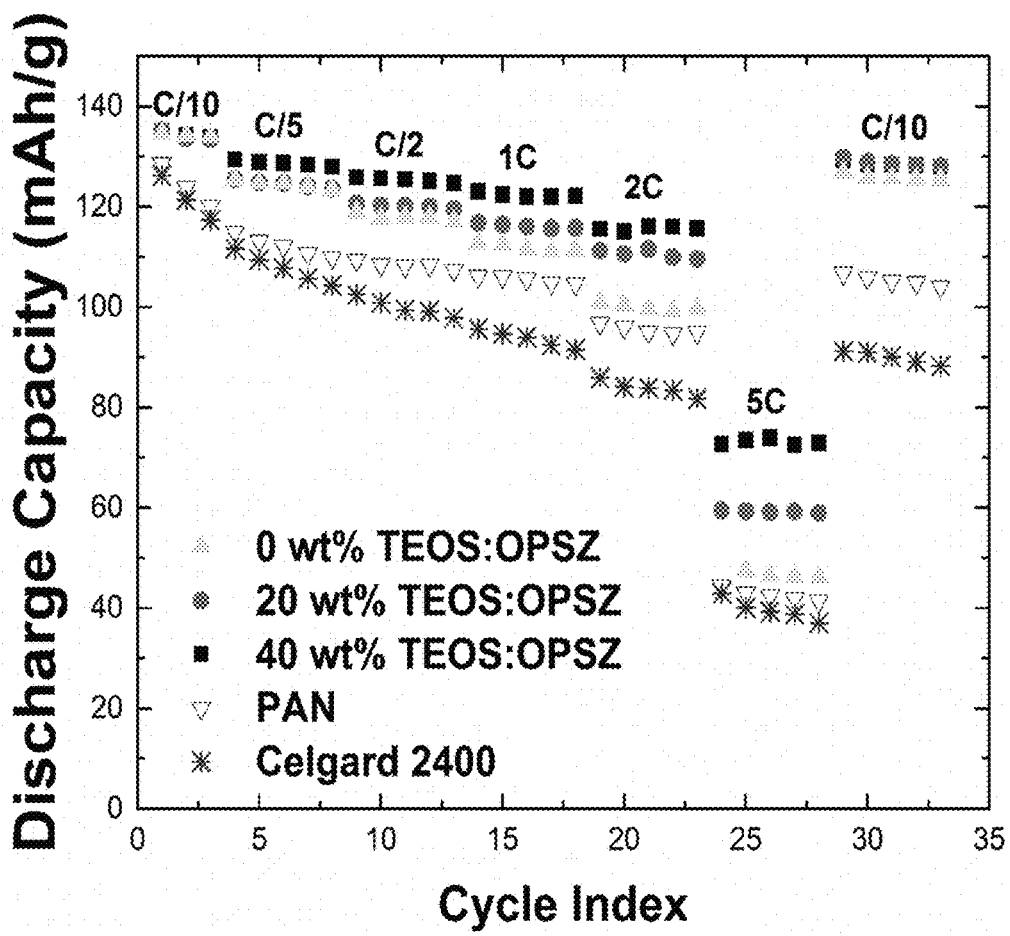
FIG. 14 illustrates capacities and rate capabilities of various additional membranes/separators provided herein relative to a commercial polyolefinic separator.
Figure 15:
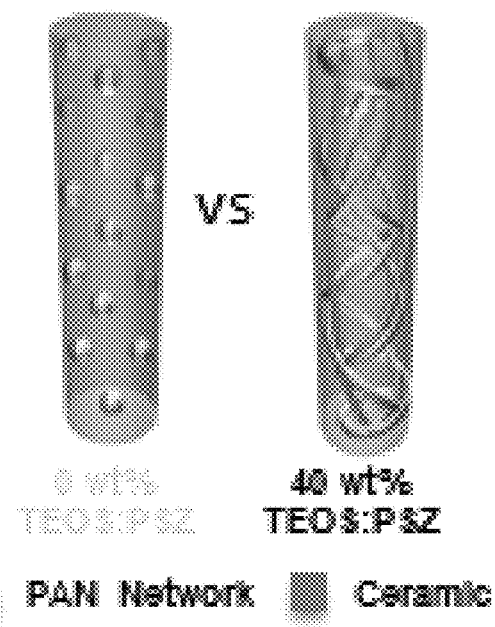
FIG. 15 illustrates a schematic of various exemplary internal ceramic morphologies in the polymer matrix in various membrane materials provided herein.
Figure 17:
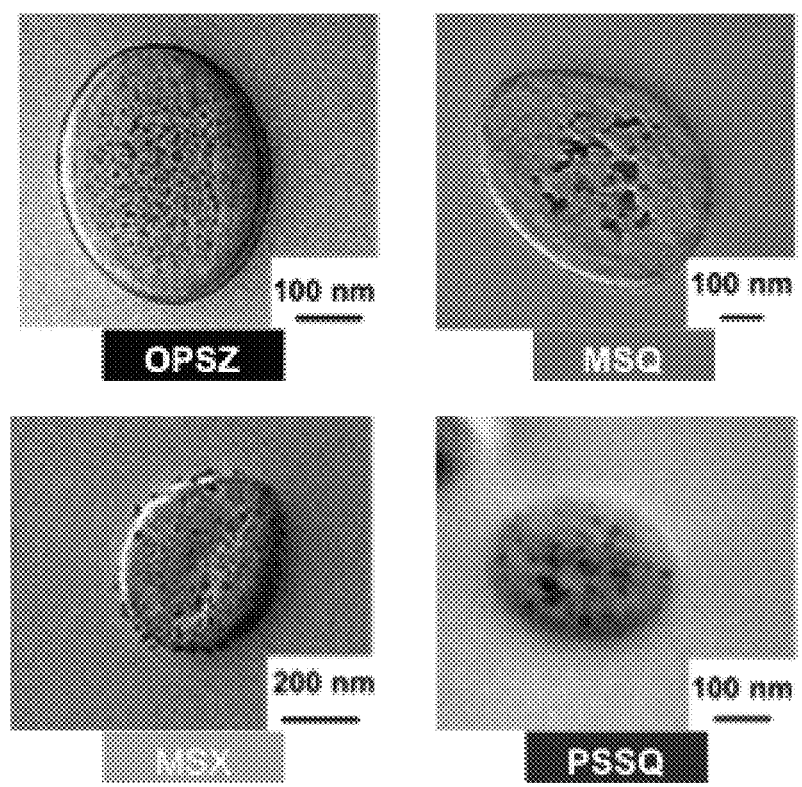
FIG. 17 illustrates TEM images of exemplary microtomed polymer-ceramic hybrid materials provided herein.

FIG. 14 illustrates additional capacity and rate data for various exemplary separator membranes provided herein. Polymer-ceramic hybrid separator membranes are prepared with a polymer (PAN) either one type of ceramic precursor (a polysilazane) or two types of ceramic precursor (an alkylated silicic acid (TEOS) and a polysilazane). As is demonstrated, improved performance parameters are observed for the combination of the silicic acid and polysilazane versus just the polysilazane alone, or with the ceramic-free PAN membrane or ceramic-free polyolefinic CELGARD® separators. FIG. 15 illustrates a schematic of the difference in internal ceramic morphologies observed for the one and two ceramic precursor systems. In some embodiments herein, a membrane comprises a polymer matrix material with one and/or two-dimensional ceramic domains and/or interconnected and/or continuous ceramic domain(s) embedded therein. As illustrated in FIG. 15 (right), in some instances, materials provided herein comprise a polymer matrix (network) with a continuous ceramic embed therein. FIG. 17 illustrates various continuous ceramic embeds, as well as various continuous ceramic shells (e.g., for the OPSZ and MSQ). In some instances, such membranes provide superior mechanic and electrochemical properties. In some instances, the interconnected domains also affect the polymer's ability to crystallize, leading to an increase in amorphous regions, which in turn leads, in some instances, to increased electrolyte uptake, superior ionic conductivity, and/or superior rate capability.

Figure 18:
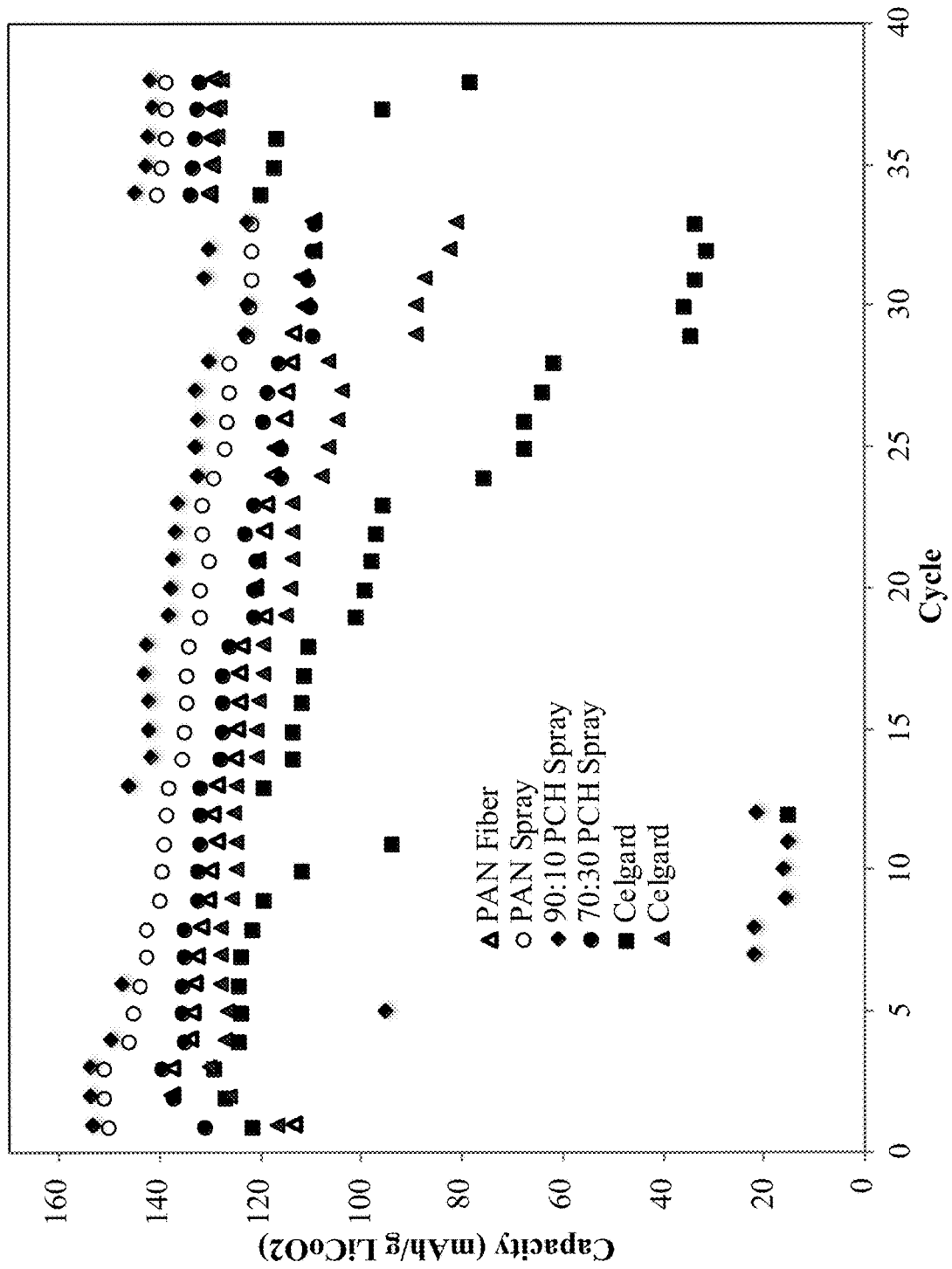
FIG. 18 illustrates capacities rate capabilities of various additional membranes/separators provided herein relative to a commercial polyolefinic separator.

FIG. 18 illustrates capacities and rate capabilities of exemplary membrane separators provided herein relative to a commercial polyolefinic separator by CELGARD®. As can be seen, the porous film separators provided herein provide very good capacities (relative to the CELGARD®) separator, and excellent rate capabilities. In particular, after initiation of the separators for a few cycles at lower charge rates, at a charge rate of 1 C the polymer and polymer-ceramic hybrid porous film membrane separators provided herein (e.g., prepared using a gas-assisted electrospray process herein) have excellent capacities (relative to a conventional polyolefin separator under identical conditions). Similarly high capacities are also observed at rates of 2 C (complete charge in 30 min), 3 C (complete charge in 20 min), and 4 C (complete charge in 15 min). Meanwhile, conventional polyolefinic separators are observed to initially have a rapid decrease in capacity and ultimately fail after only a few cycles. In the comparison, the two polymer-hybrid ceramic materials have the best performance after every cycle beginning with the 1 C cycling, with the polymer materials provided herein just below the hybrid materials, and the conventional polyolefinic separators performing much more poorly.

Figure 16:
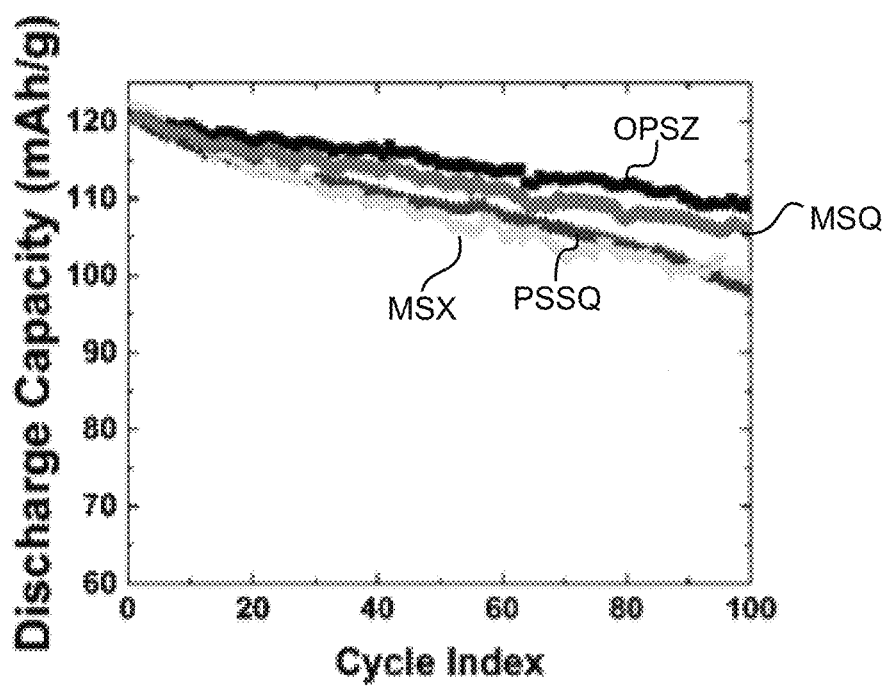
FIG. 16 illustrates capacity retention of various membranes/separators provided herein relative to a commercial polyolefinic separator.

FIG. 16 illustrates the capacity performance of a number of polymer-ceramic hybrid membrane materials, with the polysilazane derived ceramic hybrid material performing the best, the silsesquioxane derived ceramic hybrid material performing nearly as well, and the siloxane derived ceramic hybrid material and polysilsesquioxane derived ceramic hybrid material performing slightly less well than the other two exemplary materials. As can be seen in FIG. 17, the best performing materials had a ceramic coating/shell on the surface of the polymer matrix (with additional ceramic embedded within), whereas the poorer performing materials either only had a partial ceramic coating/shell or no ceramic/shell.

In certain embodiments, also provided herein are processes for the facile manufacture of such complex polymer-ceramic hybrid/composite materials by gas-assisted spinning/spraying techniques described herein. In certain instances, processes provided herein comprise spinning/spraying a fluid stock comprising a fluid medium, a polymer, an optional ceramic precursor, and an optional sacrificial polymer to readily form (e.g., via "self-assembly") a (e.g., porous) membrane, such as described herein, or a precursor thereof (e.g., such as only requiring curing and/or removal of sacrificial polymer and/or liquid medium to provide a porous membrane/separator provided herein).

In certain embodiments, provided herein is a process for manufacturing a membrane or separator herein, the process comprising generating a jet, plume or aerosol from a fluid stock. Generally, the fluid stock comprises a liquid and a polymer, and optional further inclusion materials. In specific embodiments, the jet, plume or aerosol is generated using a suitable technique, such as a spinning (e.g., electrospinning) or spray (e.g., electrospray) technique. In some embodiments, the process further comprises generating the jet, plume or aerosol in the presence of a high velocity gas. In specific instances, the high velocity gas facilitates the fine dispersion of the plume or aerosol particulates, which, in turn, facilitates the controlled and uniform deposition of the liquid and/or inclusion parts on a substrate surface. In some instances, the direction of the flow of the gas and the jet/plume/aerosol are in the same general direction (e.g., having a directional mean within 15 degrees, 10 degrees, 5 degrees, or the like of each other).

In some embodiments, provided herein are membranes, separators, and precursors thereof, as well as systems and processes for manufacturing the same. In some embodiments, membranes, separators and precursors thereof have a thickness of about 1 micron to about 50 micron (e.g., about 5 micron to about 25 micron). In some embodiments, thicker or thinner materials are also contemplated, as desired. In certain embodiments, the system is configured to or the process comprises injecting a fluid stock into a gas stream. In specific embodiments, the fluid stock is injected into the gas stream in a substantially parallel direction (e.g., within about 10 degrees, about 5 degrees, about 2 degrees, or the like of parallel). In specific embodiments, the process comprising producing an electrostatically charged jet or plume. In more specific embodiments, the plume comprises a plurality of nanoscale particles and/or droplets (e.g., <10 micron in average dimension or diameter). In still more specific embodiments, the particles or droplets (e.g., nanoscale droplets (e.g., the droplets comprising solutions, suspensions, solution-suspensions, and/or solid particles)) comprise a polymer and a liquid medium (and, e.g., a ceramic precursor, a sacrificial polymer, and/or the like).

In some embodiments, the plume is generated by: providing a fluid stock to a first inlet of a first conduit of an electrospray nozzle. In specific embodiments, the first conduit being enclosed along the length of the conduit by a wall having an interior surface and an exterior surface, the first conduit having a first outlet. In some embodiments, the fluid stock comprises a polymer and an optional ceramic precursor. In certain embodiments, the process comprises providing a (e.g., direct current) voltage to the nozzle (e.g., wall of the first conduit). In some instances, the voltage provides an electric field (e.g., at the first outlet) (e.g., which field at least partially drives the electrospraying process). In further or additional embodiments, the process further comprises providing a pressurized gas (e.g., provided from a gas supply, such as a pump, a pressurized reservoir, or the like) (e.g., a system being configured to provide a pressurized gas) to a second inlet of a second conduit of the nozzle, e.g., thereby providing high velocity gas at a second outlet of the second conduit (e.g., the high velocity gas having a velocity of about 0.1 m/s or more, about 0.5 m/s or more, about 1 m/s or more, about 5 m/s or more, about 50 m/s or more, or the like). In some embodiments, the second conduit is enclosed along the length of the conduit by a second wall having an interior surface, the second conduit having a second inlet and a second outlet. Generally, the second conduit has a second diameter, and the first conduit is positioned inside the second conduit. In specific embodiments, the exterior surface of the first wall and the interior surface of the second wall are separated by a conduit gap (e.g., the ratio of the conduit overlap length to the first diameter being about 1 to 10). In specific embodiments, the droplets (e.g., partially or wholly dried in the plume) are collected on a substrate (e.g., as a dry or semi-wet deposition (e.g., a coherent film) on the substrate). In some embodiments, the substrate is a grounded collector. In other embodiments, the substrate is configured between a grounded collector and the nozzle.

In some instances, ejecting of a fluid stock (e.g., charged fluid stock) from a nozzle (e.g., electrospray nozzle) produces a fluid jet, which may be disrupted to form a plume comprising a plurality of droplets (or plume particulates) (e.g., if the polymer concentration is low enough). In certain instances, the jet or droplets are in varying states of dryness (e.g., wherein more dry materials comprise less fluid medium relative to solid inclusion materials) as they move toward a collector, with the materials (jet/droplets) near the collector being dryer (i.e., comprising less fluid medium) (or even completely dry) than those materials (jet/droplets) near the nozzle. In some instances, the plume comprises (e.g., especially in closest proximity to the collector substrate) droplets wherein all fluid medium has been evaporated. In preferred embodiments, plume droplets (particularly in proximity to the collector substrate surface) are disrupted and small enough to reduce or minimize the number and/or amount of inclusion component (e.g., polymer, ceramic precursor, liquid medium, sacrificial polymer, and/or the like) included within each droplet. In certain instances, reducing and/or minimizing the number and/or amount of inclusion in each droplets facilitates good distribution of inclusion throughout the plume, particularly in proximity to the collector. In some instances, good distribution of inclusions within the plume facilitates good distribution of inclusions as collected on the collector substrate. In particular, membranes and coatings suffer from poor performance characteristics due to lack of uniformity of the membrane (e.g., due to variations in dispersion and/or concentration of inclusions, variations in membrane thickness, etc.).

In some instances, typical spray techniques are insufficient to adequately disrupt and break apart the droplets of the plume and are insufficient to provide good distribution of the inclusion materials in the plume and on the collector substrate so as to provide dispersions with good uniformity, particularly in systems comprising multiple inclusion types. Instead, typical spray techniques have been observed to produce agglomerations, including co-agglomerations with poor dispersion uniformity and control, without which resultant materials exhibit poor or insufficient performance characteristics.

In certain instances, processes herein comprise generating a jet, plume or aerosol (e.g., electrospraying a fluid stock) with a high velocity gas (e.g., ≥0.1 m/s, ≥0.5 m/s, ≥1 m/s, ≥5 m/s, ≥10 m/s, ≥20 m/s, ≥25 m/s, ≥50 m/s). In some instances, an (e.g., electrostatically charged) fluid stock is injected into a stream of high velocity gas. In certain instances, the high velocity gas facilitates further disruption (e.g., breaking apart) of the droplets formed during spray (e.g., electrospray) of the fluid stock. In some instances, the good dispersion of the droplets and the low concentration of inclusions per droplets facilitates the formation of a well-dispersed and well-controlled systems, such as described herein.

In certain embodiments, processes and systems described herein are suitable for high throughput of highly viscous fluid stocks. In certain instances, such processes facilitate the spray of fluid stocks having a much higher polymer content than would typically be possible (i.e., higher concentration to produce fibers than normally observed using conventional techniques). In addition, in some embodiments, high concentrations of inclusion components are preferred in order to facilitate good coverage of a surface (of a collector or substrate), good uniformity of films (e.g., thickness, dispersion, etc.), and/or the like. In certain embodiments, the fluid stock provided herein comprises at least 0.1 wt. %, at least 0.5 wt. %, or at least 1 wt. % inclusion component (e.g., polymer and precursor, alone or in combination), e.g., at least 2 wt. % inclusion component, at least 2.5 wt. % inclusion component, at least 3 wt. % inclusion component, at least 5 wt. % inclusion component, or the like (e.g., up to 50 wt. %, up to 30 wt. %, up to 20 wt. %, up to 15 wt. %, up to 10 wt. %, or the like). In certain embodiments, the fluid stock comprises about 2 wt. % to about 15 wt. % (e.g., about 10 wt. % to about 15 wt. %) inclusion component. In some instances, higher concentrations are utilized to form fibers, whereas lower concentrations are utilized to form films. In certain instances, at low concentrations, droplets are formed when stock is ejected from the nozzles (e.g., thereby forming films), whereas continuous jets (e.g., up to 5 wt. %, up to 10 wt. %, up to 15 wt. % or the like, depending on the system) and fibers are formed at higher concentrations (e.g., above 5 wt. %, above 10 wt. %, above 15 wt. %, or the like, depending on the system).

Any suitable substrate is optionally utilized. In some instances, the substrate is a grounded substrate or positioned between a plume generating nozzle and a grounded surface. In certain embodiments, the substrate has a surface that is positioned in opposing relation to a plume generating nozzle outlet (e.g., there is "line of sight" between the nozzle outlet and the substrate surface). In specific embodiments, the opposing substrate is directly opposing the nozzle (e.g., configured orthogonal to nozzle conduit configuration, such as illustrated in FIG. 3). In other specific embodiments, the opposing substrate is angled or offset from directly opposing the nozzle. In some embodiments, the substrate is affixed to or is a part of a conveyor system (e.g., to facilitate continuous manufacturing of coatings, films, or the like). In specific embodiments, the substrate is attached to a conveyor belt or is a part of a conveyor belt.

In certain embodiments, a process described herein is a gas assisted or gas controlled process. In some embodiments, a fluid stock provided herein is sprayed or spun with a gas stream. In specific embodiments, a fluid stock described herein is injected into a gas stream during electrospraying or electrospinning. In some embodiments, a process of producing of an electrostatically charged jet or plume from a fluid stock further comprises providing a pressurized gas to a second inlet of a second conduit of a nozzle described herein. In specific embodiments, the second conduit has a second inlet and a second outlet, and at least a portion of the first conduit being positioned inside the second conduit (i.e., at least a portion of the second conduit being positioned in surrounding relation to the first conduit). In certain embodiments, the gap between the outer wall of the inner conduit and the inner wall of the outer conduit is small enough to facilitate a high velocity gas at the nozzle, such as to facilitate sufficient disruption of the charged fluid (jet) ejected from the nozzle (e.g., such as to provide plume or aerosol dispersions described herein). In some embodiments, the conduit gap is about 0.01 mm to about 30 mm, such as about 0.05 mm to about 20 mm, about 0.1 mm to about 10 mm, or the like. In certain embodiments, the gas stream (e.g., at the second outlet) has a high velocity, such as a velocity of at least 0.5 m/s, e.g., at least 1 m/s, at least 5 m/s, at least 10 m/s, at least 20 m/s, or more.

In further or alternative embodiments, membranes provided herein have uniform thickness (e.g., the systems and/or processes provided herein provide even distribution of droplets over the target surface area, and/or deliver small droplets to the surface, minimizing "high spots" caused by large droplets/particle depositions). In specific embodiments, the membrane has a thickness variation (e.g., in a selected area, such as when an entire surface is not coated, such as an area that is not near the edge of the coating, e.g., an area that is more than 10% or 20% of the length, width, or diameter away from the edge of the coating) of less than about 100% of the average membrane thickness, e.g., about 50% or less of the average membrane thickness, about 20% or less of the average thickness, about 10% or less of the average thickness, about 5% or less of the average thickness, or the like. In some embodiments, the standard deviation of the film thickness is less than 200% the average thickness, less than 100% the average thickness, less than 50% the average thickness, less than 20% the average thickness, or the like.

In specific embodiments, the fluid stock comprises a polymer (e.g., in a concentration low enough such that a fiber is not formed upon manufacturing using a process and/or system described herein). In specific embodiments, the concentration of the polymer in the fluid stock is about 5 wt. % or less (e.g., about 0.5 wt. % to about 5 wt. %). In some instances, higher concentrations are utilized for spin techniques described herein, such as about 5 wt. % to about 20 wt. %.

In certain embodiments, a ceramic precursor included in a process or fluid stock provided herein is or comprises polysilazane, silsesquioxane (e.g., polyhedral oligomeric silsesquioxane (POSS), poly(organosilsesquioxane), or polysilsesquioxane (PSSQ)), and/or combinations thereof.

In some embodiments, the fluid stock comprises a liquid medium, e.g., the liquid medium serving to dissolve and/or suspend the additives. Any suitable liquid medium is optionally used, but in specific embodiments, the liquid medium is or comprises, by way of non-limiting example, water, an alcohol, dimethylformamide (DMF), tetrahydrofuran (THF), Dimethylacetamide (DMAc), dicloromethane (DCM), chloroform, or N-methyl-pyrrolidone (NMP). In some embodiments, the liquid medium is utilized to dissolve and/or suspend additives described herein. In some instances, e.g., to facilitate uniformity of the fluid stock (e.g., solutes and/or suspended agents therein), the fluid stock is agitated (e.g., by stirring, sonicating, and/or any other suitable mechanism) prior to being provided to the first inlet. In certain embodiments, if a liquid polymer (e.g., melt) or liquid precursor is utilized, the amount of liquid medium utilized may be reduced or eliminated.

In certain embodiments, any suitable nozzle system configuration is acceptable. In specific embodiments, the first diameter is about 0.1 mm to about 10 mm (e.g., about 0.15 mm to about 8 mm, or about 0.15 mm to about 5 mm). In further or alternative embodiments, the second diameter is any suitable diameter that is larger than the first diameter. In specific embodiments, the second diameter is about 0.2 mm to about 15 mm (e.g., about 2 mm to about 8 mm). In certain embodiments, the conduit gap (the average distance between the exterior surface of the inner conduit wall and the interior surface of the outer conduit wall) is any suitable distance, such as a distance configured to allow suitable airflow quantity and/or velocity to the nozzle tip and beyond, e.g., to break up and/or otherwise facilitate reducing the size of the droplets produced by the spraying process and/or system, facilitate throughput, facilitate jet control, or the like. In specific embodiments, the conduit gap is about 0.1 mm or more (e.g., about 0.5 mm or more). In certain embodiments, the spraying process and/or system provided herein comprises applying and/or is configured to provide a voltage to the nozzle, the voltage being about 8 kV to about 30 kV (e.g., about 10 kV to about 25 kV). In certain embodiments, such as wherein multiple nozzles are utilized, higher voltages are contemplated. In certain embodiments, a power supply is configured to provide a voltage to the nozzle. In some instances, higher voltage are optionally utilized when a voltage is applied to nozzle system comprising a number of nozzles. In some embodiments, if appropriate, a voltage is optionally not applied to a system and/or process provided herein.

In certain embodiments, processes and/or systems provided herein allow high flow rates (e.g., relative to other spray systems). In specific embodiments, the flow rate of the fluid stock (e.g., provided to the first inlet of the nozzle) is about 0.05 or more (e.g., about 0.05 mL to about 5 mL/min, about 0.1 mL or more, about 0.5 mL or more, about 1 mL or more, or the like).

In certain embodiments, processes and/or systems provided herein allow the processing of highly viscous fluids (e.g., relative to other spray systems). In some embodiments, the fluid stock has any suitable viscosity. In addition, the process and systems described herein allow for the manufacture of membranes and separators using highly viscous (and, e.g., highly loaded) fluid stocks, if desired. For example, in some embodiments, fluid stocks utilized in systems and processes herein have a viscosity of about 0.5 centipoise (cP) or more, e.g., about 5 cP or more, or about 1 cP to about 10 Poise. In more specific embodiments, the viscosity is about 10 cP to about 10 Poise. In some instances, gas-driven systems and processes described herein allow for the production of a jet, aerosol or plume that has enough inclusion component to facilitate good, high through-put formation of membranes (e.g., mats and/or films) that would not be possible using conventional techniques. In certain embodiments, the viscosity of the fluid stock is at least 200 centipoise (cP), such as at least 500 cP, at least 1000 cP, at least 2000 cP, at least 2,500 cP, at least 3,000 cP, at least 4,000 cP, or the like (e.g., up to 20,000 cP, up to about 10,000 cP, or the like). In certain embodiments, the viscosity of the fluid stock is about 2,000 cP to about 10,000 cP.

In some embodiments, provided herein is a process for producing a (e.g., porous) membrane (e.g., film or fiber mat) or separator, the process comprising spraying (e.g., electrospraying) or spinning (e.g., electrospinning) a fluid stock with a gas (e.g., a controlled gas flow). In certain embodiments, the fluid and the gas are ejected from an spray (e.g., electrospray) or spin (e.g., electrospin) nozzle in a similar direction. In some instances, the direction of ejection of the fluid stock and the gas from the nozzle is within about 30 degrees of one another, or, more preferably within about 15 degrees of one another (e.g., within about 10 degrees or within about 5 degrees of one another). In certain embodiments, the fluid stock and the gas are configured to be ejected from the nozzle in a coaxial configuration. In some instances, configurations and processes described herein allow for an enhanced driving force (e.g., of electrospray or electrospin), combining the driving forces of electric field gradient with high speed gas. In certain instances, configurations and processes described herein provided for several improvements in electrospray/electrospin processing, including in the manufacture of membranes and separators, such as described herein. In addition, in some instances, such configurations allow for process throughput up to tens or hundreds of times greater than simple electrospray and/or electrospin manufacturing and allow for the processing of high viscosity and/or highly loaded fluids. Moreover, in some instances, such techniques and systems allow for the manufacture of highly uniform membranes, separators, and the like. By contrast, other or conventional electrospray is not generally of commercial use in such applications because of, e.g., non-uniform deposition of large drops and dispersion of inclusions in droplets, especially for complex systems.

Figure 1:
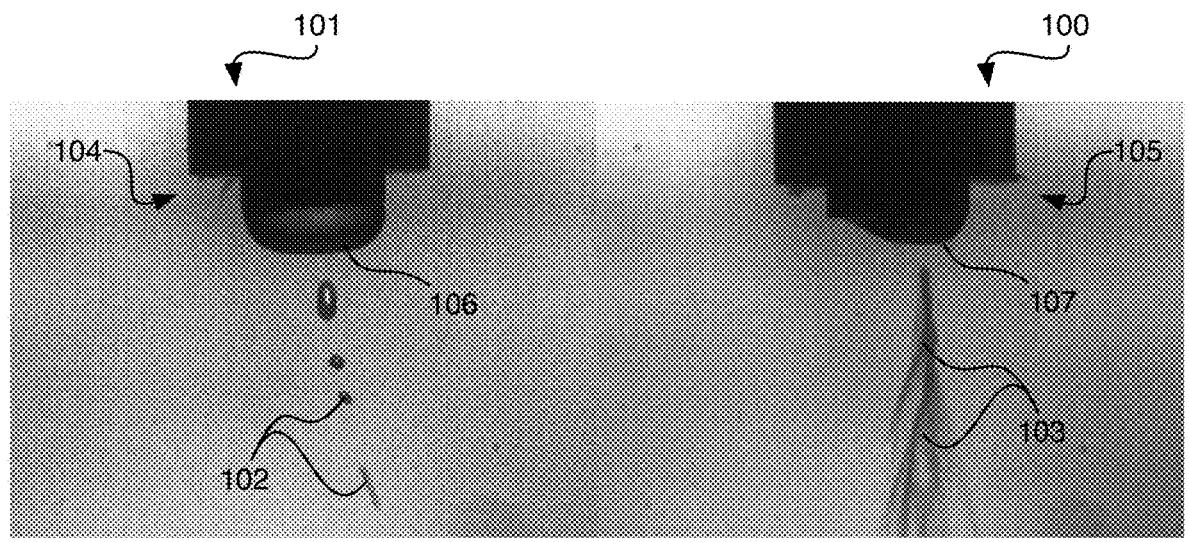
Figure 2:
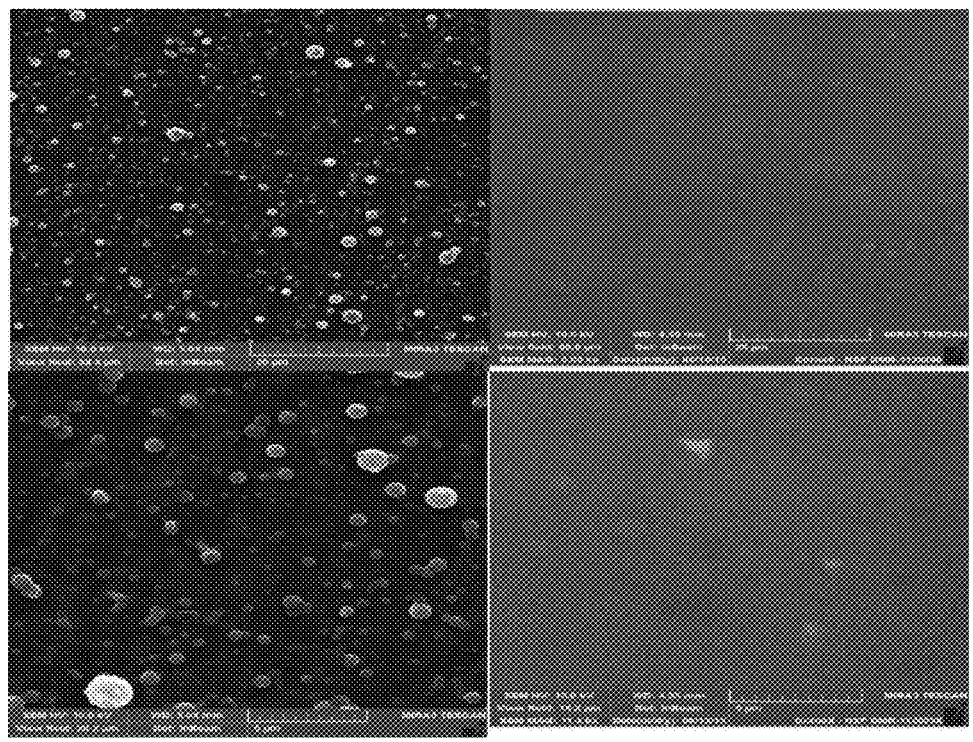
Figure 4:
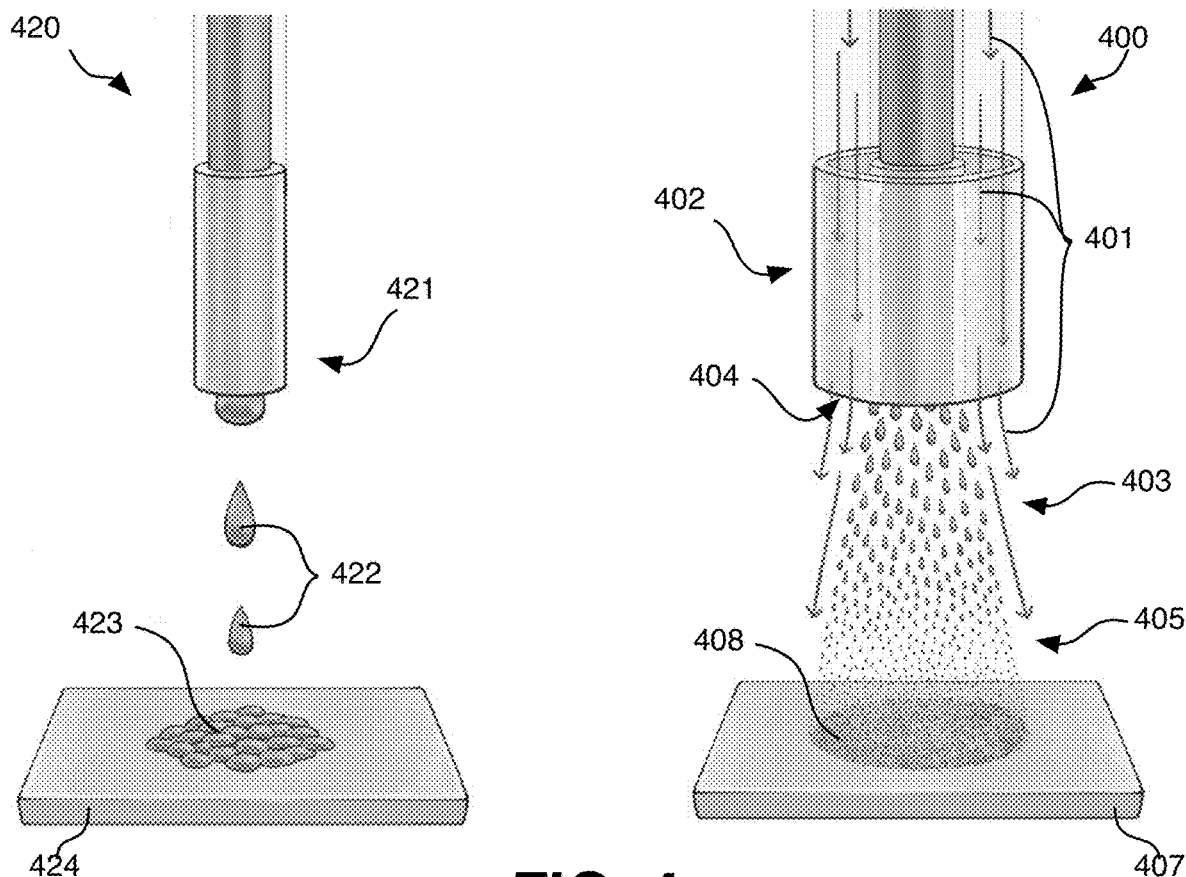

In some instances, spraying/spinning (e.g., using a process and/or system provided herein) of the fluid stock results in the formation of a jet, e.g., which subsequently deforms into a plume comprising a plurality of droplets (collectively referred to herein so as to encompass, e.g., droplet solutions, droplet suspensions, and/or solid particles in an plume or aerosol) in the case of spraying. In certain instances, spray (e.g., electrospray) (e.g., using a process and/or system provided herein) of a fluid stock, such as provided herein results in the formation of a plume comprising a plurality of droplets (collectively referred to herein so as to encompass, e.g., droplet solutions, droplet suspensions, and/or solid particles in an electrospray plume). In some instances, the processes described herein results in the formation of small droplets (e.g., micro- or nano-scale droplets) having highly uniform size distributions (e.g., especially relative to standard electrospray techniques. FIG. 1 illustrates high speed imaging of electrospray of a fluid stock using conventional electrospray techniques 101 and an exemplary gas controlled electrospray technique provided herein 100. As illustrated in FIG. 1, the "plume" of the conventional electrospray process near the nozzle 104 comprises much larger droplets 102 having a less uniform size distribution than the droplets 103 of the plume resulting near the nozzle 105 of the gas controlled electrospray processes described herein. In some instances, smaller and more uniform droplet size provides improved uniformity of depositions, such as illustrated in FIG. 2. FIG. 2 illustrates depositions manufactured by an exemplary conventional electrospray techniques (left panels) and an exemplary gas controlled electrospray process provided herein (right panels). As illustrated in FIG. 2, depositions formed by conventional electrospray techniques provide depositions that are not uniform and comprise large particles, relative to the depositions formed by exemplary gas controlled electrospray systems and processes described herein. FIG. 4 shows an exemplary illustration of a gas controlled electrospray system provided herein 400 and an exemplary illustration of a non-gas controlled electrospray system 420. In some instances, a non gas-controlled system results, upon spraying from a nozzle 421, in the formation of large droplets 422, which droplets are large and not well dispersed in the "plume" and irregular depositions 423 on the collector 424. This illustration is further demonstrated in FIGS. 1 and 2 by the high speed imaging of spraying 101 (FIG. 1), and as collected (FIG. 2, left panels). By contrast, in some embodiments, gas-controlled systems (and processes) provided herein provide electrospray of a fluid stock with a gas (illustrated by the downward arrows) 401 (e.g., having a controlled flow, such as circumferentially configured with the dispensing of the fluid stock) from a nozzle 402 (e.g., coaxially arranged, as illustrated in FIG. 4). In some embodiments, with the flow of air, the droplets 403 proximal to the nozzle are smaller relative to non-gas controlled techniques (e.g., in some instances due to the controlled air flow at the nozzle end 404), and even smaller still as the droplets 405 move away from the nozzle toward the collector (droplets distal to the nozzle 406 and/or proximal to a collector 407). In some embodiments, such uniformity (e.g., uniformity of size, horizontal distribution, etc.) of dispersion of small droplets provides for a deposition 408 having a greatly improved uniformity of thickness, dispersion of inclusions, micron or sub-micron scaled phase separation (e.g., between polymer, ceramic or ceramic precursor, sacrificial polymer, and/or liquid medium phases), micron or sub-micron (e.g., mesoscale) pore formation, and/or the like. This illustration is further demonstrated in FIGS. 1 and 2 by the high speed imaging of spraying 101 (FIG. 1), and as collected (FIG. 2, right panels).

In certain instances, uniformity in the plume/aerosol allows for much greater control of deposition formation, such as thickness, thickness uniformity, compositional uniformity (e.g., in composites), and the like. In certain embodiments, membranes (e.g., films) or separators provided herein have an average thickness ($d_f$) that is about 50 micron or less, such as about 35 micron or less, about 25 micron or less, or about 15 micron or less. In some embodiments, the thickness of the membrane (e.g., film) is controlled by limiting or lengthening the residence time of a collector surface opposite an active nozzle system (e.g., using batch or continuous (e.g., using a conveyor) system). In certain embodiments, the membranes (e.g., films) or separators provided herein have good thickness uniformity, such as wherein the thinnest portion of the film is $>d_f/10$, $>d_f/5$, $>d_f/4$, $>d_f/3$, $>d_f/2$, or the like. In further or alternative embodiments, the thickest portion of the membranes (e.g., films) or separators is $<10\times d_f$, $<5\times d_f$, $<3\times d_f$, $<2\times d_f$, $<1.5\times d_f$, $<1.2\times d_f$, or the like. In preferred embodiments, the minimum thickness of the membranes (e.g., films) or separators is greater than 0.9 $d_f$, (more preferably greater than 0.95 $d_f$) and the maximum thickness of the membranes (e.g., films) or separators is less than 1.1 $d_f$, (more preferably, less than 1.05 $d_f$). In some embodiments, the membranes or separators provided herein have an average thickness, wherein the thickness variation is less than 50% of the average thickness, e.g., less than 30% of the average thickness, or less than 20% of the average thickness.

In certain embodiments, the plurality of particles and/or droplets of an aerosol or plume provided herein are micron or sub-micron (e.g., nano or meso) scaled particles and/or droplets. In more specific embodiments, the plurality of particles and/or droplets have an average diameter of about 100 microns or less, about 50 microns or less, less than 30 micron, about 20 microns or less, less than 15 micron, or about 10 microns or less. In still more specific embodiments, the plurality of particles and/or droplets have an average diameter of about 5 microns or less, e.g., about 1 micron or less. In certain embodiments, the size of the particles and/or droplets is highly uniform (e.g., at a given distance from the nozzle), with the standard deviation of the particle and/or droplet size (e.g., at a given distance from the nozzle) being about 50% of the average size of the particles and/or droplets, or less (e.g., about 40% or less, about 30% or less, about 20% or less, about 10% or less, or the like) (e.g., at any given distance from the nozzle, e.g., about 10 cm or more, about 15 cm or more, about 20 cm or more, about 25 cm or more, from the nozzle, or about halfway between the nozzle and the collector, ¾ of the way from the nozzle to the collector, or the like).

In some embodiments, the fluid stock, the jet, and/or the plume comprises a fluid (e.g., water) and an inclusion component (e.g., polymer and/or ceramic precursors). In certain embodiments, compositions provided herein comprise a plurality of droplets, a jet, or a fluid stock comprising a fluid (e.g., water), a polymer, and a ceramic precursor. In various embodiments, individual droplets optionally comprise one or more inclusion type and/or other additive. Further, some or all of the fluid of the droplets (of the plume) may be evaporated during processing (e.g., prior to deposition). In various embodiments, concentrations of inclusion materials in droplets described herein, or a composition comprising the same, are generally higher than the concentrations of such materials in the fluid stock, or even in the jet (where evaporation of the fluid begins). In certain embodiments, droplets or compositions comprising the droplets having inclusions concentrations of at least 1.5×, at least 2×, at least 3×, at least 5×, at least 10×, or the like (e.g., wherein the inclusions make up up to 70 wt. % or more, 80 wt. % or more, 90 wt. % or more, or even 100 wt. % of the droplets or composition/plume comprising the same) of the concentrations of the droplets or composition/plume comprising the same. In specific embodiments, such concentrations are achieved at any given distance from the nozzle, e.g., about 10 cm or more, about 15 cm or more, about 20 cm or more, about 25 cm or more, from the nozzle, or about halfway between the nozzle and the collector, ¾ of the way from the nozzle to the collector, or the like.

In some embodiments, a process or system provided herein allows for high throughput processing (e.g., relative to other non-gas controlled techniques). In some instances, the controlled air flow allows for an increase rate and uniformity in dispersion and/or breaking up of the jet and the plume, allowing for increased fluid stock flow rates, while also increasing deposition uniformity. In various embodiments, the fluid stock is provided to the nozzle at any suitable flow rate, such as about 0.01 mL/min or more, about 0.05 mL/min or more, about 0.1 mL/min or more, about 0.2 mL/min or more, or about 0.01 mL/min to about 10 mL/min. In certain embodiments, the fluid stock is provided to the first inlet at a rate of about 0.01 to about 10 mL/min, e.g., about 0.05 mL/min to about 5 mL/min, or about 0.5 mL/min to about 5 mL/min.

In specific embodiments, a process described herein comprises providing a fluid stock to a first inlet of a first conduit of a nozzle, the first conduit being enclosed along the length of the conduit by a wall having an interior surface and an exterior surface, the first conduit having a first outlet. In specific instances, the walls of the first conduit form a capillary tube, or other structure. In some instances, the first conduit is cylindrical, but embodiments herein are not limited to such configurations.

Figure 8:
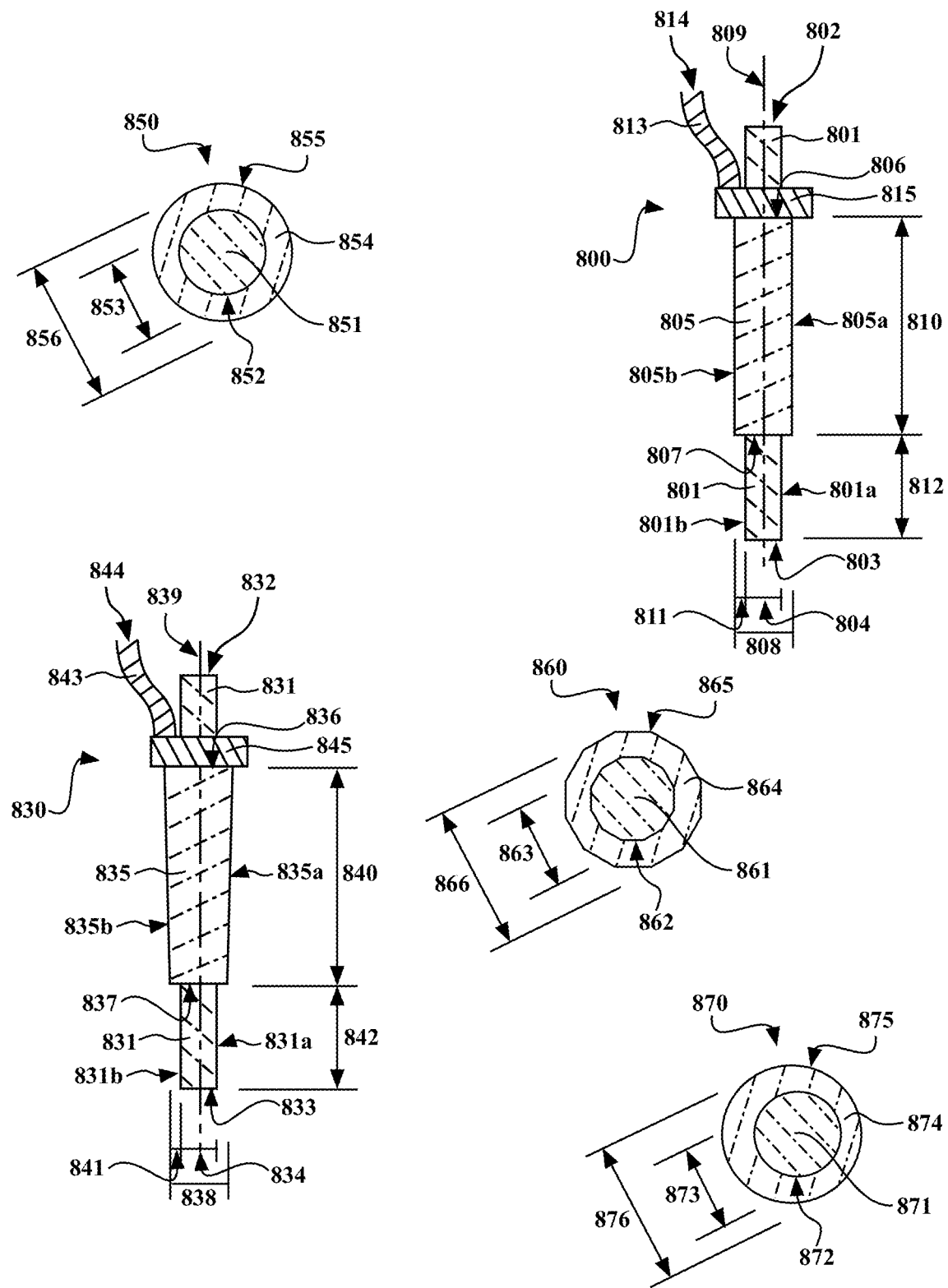

FIG. 8 illustrates exemplary nozzle apparatuses 800 and 830 provided herein. Illustrated by both nozzle components 800 and 830 some embodiments, the nozzle apparatus comprises a nozzle component comprising a first (inner) conduit, the first conduit being enclosed along the length of the conduit by a first wall 801 and 831 having an interior and an exterior surface, and the first conduit having a first inlet (or supply) end 802 and 832 (e.g., fluidly connected to a first supply chamber and configured to receive a fluid stock) and a first outlet end 803 and 833. Generally, the first conduit has a first diameter 804 and 834 (e.g., the average diameter as measured to the inner surface of the wall enclosing the conduit). In further instances, the nozzle component comprising a second (outer) conduit, the second conduit being enclosed along the length of the conduit by a second wall 805 and 835 having an interior and an exterior surface, and the second conduit having a second inlet (or supply) end 806 and 836 (e.g., fluidly connected to a second supply chamber and configured to receive a gas—such as a high velocity or pressurized gas (e.g., air)) and a second outlet end 807 and 837. In some instances, the second inlet (supply) end 806 and 836 is connected to a supply chamber. In certain instances, the second inlet (supply) end 806 and 836 are connected to the second supply chamber via a supply component. FIG. 8 illustrates an exemplary supply component comprising a connection supply component (e.g., tube) 813 and 843 that fluidly connects 814 and 844 the supply chamber (not shown) to an inlet supply component 815 and 845, which is fluidly connected to the inlet end of the conduit. The figure illustrates such a configuration for the outer conduit, but such a configuration is also contemplated for the inner and any intermediate conduits as well. Generally, the first conduit has a first diameter 808 and 838 (e.g., the average diameter as measured to the inner surface of the wall enclosing the conduit). The first and second conduits have any suitable shape. In some embodiments, the conduits are cylindrical (e.g., circular or elliptical), prismatic (e.g., a octagonal prism), conical (e.g., a truncated cone—e.g., as illustrated by the outer conduit 835) (e.g., circular or elliptical), pyramidal (e.g., a truncated pyramid, such as a truncated octagonal pyramid), or the like. In specific embodiments, the conduits are cylindrical (e.g., wherein the conduits and walls enclosing said conduits form needles). In some instances, the walls of a conduit are parallel, or within about 1 or 2 degrees of parallel (e.g., wherein the conduit forms a cylinder or prism). For example, the nozzle apparatus 800 comprise a first and second conduit having parallel walls 801 and 805 (e.g., parallel to the wall on the opposite side of the conduit, e.g., as illustrated by 801a/801b and 805a/805b, or to a central longitudinal axis 809). In other embodiments, the walls of a conduit are not parallel (e.g., wherein the diameter is wider at the inlet end than the outlet end, such as when the conduit forms a cone (e.g., truncated cone) or pyramid (e.g., truncated pyramid)). For example, the nozzle apparatus 830 comprise a first conduit having parallel walls 831 (e.g., parallel to the wall on the opposite side of the conduit, e.g., as illustrated by 831a/831b, or to a central longitudinal axis 839) and a second conduit having non-parallel walls 835 (e.g., not parallel or angled to the wall on the opposite side of the conduit, e.g., as illustrated by 835a/835b, or to a central longitudinal axis 839). In certain embodiments, the walls of a conduit are within about 15 degrees of parallel (e.g., as measured against the central longitudinal axis, or half of the angle between opposite sides of the wall), or within about 10 degrees of parallel. In specific embodiments, the walls of a conduit are within about 5 degrees of parallel (e.g., within about 3 degrees or 2 degrees of parallel). In some instances, conical or pyramidal conduits are utilized. In such embodiments, the diameters for conduits not having parallel walls refer to the average width or diameter of said conduit. In certain embodiments, the angle of the cone or pyramid is about 15 degrees or less (e.g., the average angle of the conduit sides/walls as measured against a central longitudinal axis or against the conduit side/wall opposite), or about 10 degrees or less. In specific embodiments, the angle of the cone or pyramid is about 5 degrees or less (e.g., about 3 degrees or less). Generally, the first conduit 801 and 831 and second conduit 805 and 835 having a conduit overlap length 810 and 840, wherein the first conduit is positioned inside the second conduit (for at least a portion of the length of the first and/or second conduit). In some instances, the exterior surface of the first wall and the interior surface of the second wall are separated by a conduit gap 811 and 841. In certain instances, the first outlet end protrudes beyond the second outlet end by a protrusion length 812 and 842. In certain instances, the ratio of the conduit overlap length-to-second diameter is any suitable amount, such as an amount described herein. In further or alternative instances, the ratio of the protrusion length-to-second diameter is any suitable amount, such as an amount described herein, e.g., about 1 or less.

FIG. 8 also illustrates cross-sections of various nozzle components provided herein 850, 860 and 870. Each comprises a first conduit 851, 861 and 871 and second conduit 854, 864, and 874. As discussed herein, in some instances, the first conduit is enclosed along the length of the conduit by a first wall 852, 862 and 872 having an interior and an exterior surface and the second conduit is enclosed along the length of the conduit by a second wall 855, 865 and 875 having an interior and an exterior surface. Generally, the first conduit has any suitable first diameter 853, 863 and 864 and any suitable second diameter 856, 866, and 876. The cross-dimensional shape of the conduit is any suitable shape, and is optionally different at different points along the conduit. In some instances, the cross-sectional shape of the conduit is circular 851/854 and 871/874, elliptical, polygonal 861/864, or the like.

In some instances, coaxially configured nozzles provided herein and coaxial gas controlled processing provided herein comprises providing a first conduit or fluid stock along a first longitudinal axis, and providing a second conduit or gas (e.g., pressurized or high velocity gas) around a second longitudinal axis (e.g., and electrospraying the fluid stock in a process thereof). In specific embodiments, the first and second longitudinal axes are the same. In other embodiments, the first and second longitudinal axes are different. In certain embodiments, the first and second longitudinal axes are within 500 microns, within 100 microns, within 50 microns, or the like of each other. In some embodiments, the first and second longitudinal axes are aligned within 15 degrees, within 10 degrees, within 5 degrees, within 3 degrees, within 1 degree, or the like of each other. For example, FIG. 8 illustrates a cross section of a nozzle component 870 having an inner conduit 871 that is off-center (or does not share a central longitudinal axis) with an outer conduit 874. In some instances, the conduit gap (e.g., measurement between the outer surface of the inner wall and inner surface of the outer wall) is optionally averaged—e.g., determined by halving the difference between the diameter of the inner surface of the outer wall 876 and the diameter of the outer surface of the inner wall 872. In some instances, the smallest distance between the inner surface of the outer wall 876 and the diameter of the outer surface of the inner wall 872 is at least 10% (e.g., at least 25%, at least 50%, or any suitable percentage) of the largest distance between the inner surface of the outer wall 876 and the diameter of the outer surface of the inner wall 872.

In some embodiments, the polymer has any suitable molecular weight. For example, in certain embodiments, the polymer has a molecular weight of at least 5,000 atomic mass units ("amu"), at least 10,000 amu, at least 20,000 amu, at least 50,000 amu, and the like. A polymer in used in a process or found in a composition herein has any suitable PDI (weight average molecular weight divided by the number average molecular weight). In some embodiments, the polymer has a polydispersity index of about 1 to about 10, about 2 to about 5, about 1 to about 5, or the like.

In certain embodiments, any suitable amount of polymer is optionally utilized in a fluid stock provided herein. In some instances, the amount of polymer utilized is less than the amount that would inhibit the formation of a plume (dispersion and/or breaking-up of the jet) when being sprayed. In some instances, with the use of the gas controlled spray processes, greater amounts of polymer are optionally utilized when compared to conventional spray techniques because of the effect of the gas to further break-up the jet and/or plume, providing greater formation, dispersion and control of droplets. In certain embodiments, the amount of polymer present in the fluid stock is less than 10 wt. %. In more specific embodiments, the amount of polymer present in the fluid stock is 0 wt. % to about 5 wt. % (e.g., about 0.1 wt. % to about 5 wt. %, or about 0.5 wt. % to about 5 wt. %). In other instances, the amount of polymer utilized is at least the amount that is required to result in the formation of a jet and a fiber, without forming a plume (e.g., dispersion and/or breaking-up of the jet) when being spun. In some instances, with the use of the gas controlled spin processes, greater amounts of polymer are optionally utilized when compared to conventional spin techniques because of the effect of the gas to further improve processing capabilities and throughput. In certain embodiments, the amount of polymer present in the fluid stock is at least about 5 wt. %. In more specific embodiments, the amount of polymer present in the fluid stock is at least 10 wt. %. In still more specific embodiments, the amount of polymer present in the fluid stock is about 5 wt. % to about 50 wt. % (e.g., about 10 wt. % to about 50 wt. %, or about 10 wt. % to about 30 wt. %).

In certain embodiments, the liquid medium comprises any suitable solvent or suspending agent. In some embodiments, the liquid medium is merely utilized as a vehicle and is ultimately removed, e.g., by evaporation during the spray or spin (e.g., electrospray or electrospin) process and/or upon drying of the deposition. In certain embodiments, the liquid medium comprises water, an alcohol (e.g., methanol, ethanol, isopropanol, propanol, butyl alcohol, or the like), dimethylformamide (DMF), tetrahydrofuran (THF), Dimethylacetamide (DMAc), N-methyl-pyrrolidone (NMP), or a combination thereof. In certain embodiments, the liquid medium comprises a liquid precursor material that is converted upon deposition to a desired material, such as a ceramic. In some specific embodiments, the liquid medium comprises polysilazane, a silsesquioxone (e.g., polyhedral oligomeric silsesquioxane (POSS), poly(organosilsesquioxane), or polysilsesquioxane (PSSQ)), or a combination thereof. In some instances, unless otherwise stated, the ceramic precursor optionally fulfills the role of both liquid medium and ceramic precursor. In specific (e.g., preferred) instances, the ceramic precursor does not fulfill the role of liquid medium.

In some embodiments, the ceramic precursor is a polysilaazane, such as having a structure of general formula (I):

—[SiR$^1$R$^2$—NR$^3$]$_n$— (I)

Figure 5:
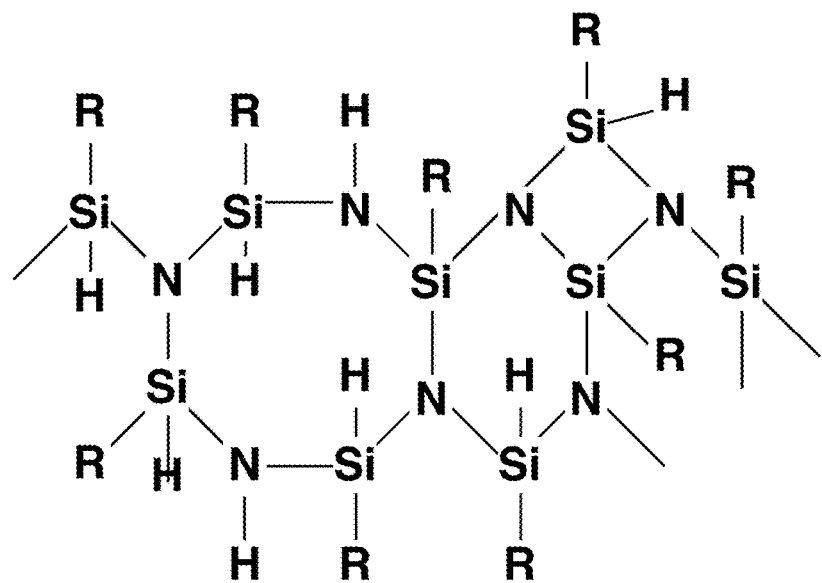
Figure 9:
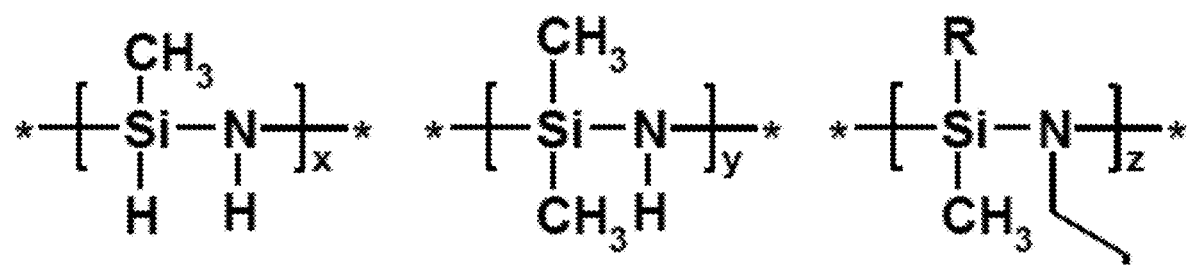

In some instances, the polysilazane has a chain, cyclic, crosslinked structure, or a mixture thereof. FIG. 5 illustrates an exemplary silazane structure having a plurality of units of Formula I with cyclic and chain structures. In various embodiments, the polysilzane comprises any suitable number of units, such as 2 to 10,000 units and/or n is any suitable value, such as an integer between 2 and 10,000. In certain embodiments, the polysilazane of formula I has an n value such that the 100 to 100,000, and preferably from 300 to 10,000. Additional units are optionally present where each R$^1$ or R$^2$ is optionally cross-linked to another unit at the N group—e.g., forming, together with the R$^3$ of another unit a bond—such cross-links optionally form links between separate linear chains, or form cyclic structures, or a mixture thereof. In an exemplary embodiment, a compound of formula I comprises a plurality of units having a first structure, e.g., —[SiHCH$_3$—NCH$_3$]—, and a plurality of units having a second structure, e.g., —[SiH$_2$NH]—. In specific embodiments, the ratio of the first structure to the second structure is 1:99 to 99:1. Further, in certain embodiments, the compound of Formula I optionally comprises a plurality of units having a third structure, such as wherein the ratio of the first structure to the third structure is 1:99 to 99:1. The various first, second, and optional third structures may be ordered in blocks, in some other ordered sequence, or randomly. In specific embodiments, each R$^1$, R$^2$, and R$^3$ is independently selected from H and substituted or unsubstituted alkyl (straight chain, branched, cyclic or a combination thereof; saturated or unsaturated). Exemplary, polysilazanes provided herein comprise one or more unit of FIG. 9, wherein x, y, and z are individually any suitable integer, such as 1 to about 100 or 1 to about 1,000 or more, and R is as described above for R$^1$ or R$^2$.

In some embodiments, the ceramic precursor is a silsesquioxane, such as having a structure of general formula (II):

—[SiR$^1$R$^2$—O]$_n$— (II)

Figure 6:
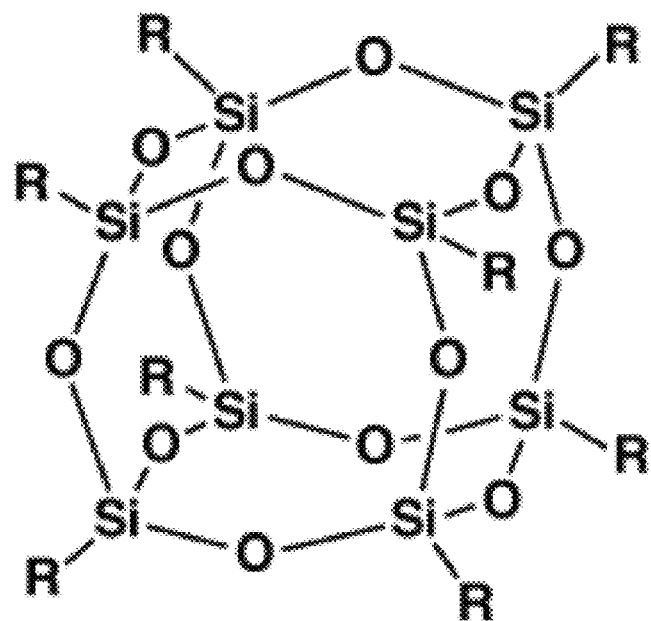
Figure 7:
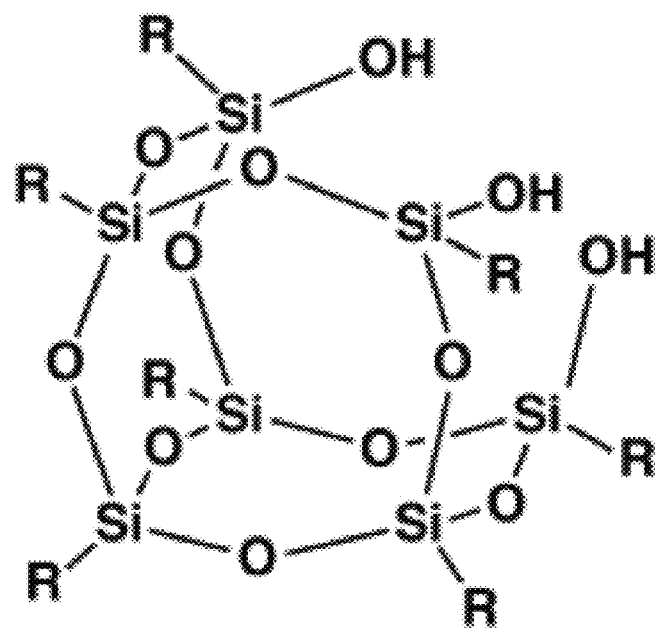

In some instances, the compound is a silsesquioxane having a cage (e.g., polyhedral oligomeric) or opened cage (e.g., wherein an SiR$^1$ is removed from the cage) structure. FIG. 6 illustrates an exemplary cage wherein n is 8 (wherein the R group of FIG. 6 is defined by R$^1$ herein). FIG. 7 illustrates an exemplary opened cage wherein n is 7 (wherein the R group of FIG. 7 is defined by R$^1$ herein). In some instances, an R$^1$ or R$^2$ group of one unit is taken together with an R$^1$ or R$^2$ group of another unit to form an —O— (e.g., forming a ladder-like polysilsesquiloxane). In certain embodiments, a cage structure is optionally formed when several an R$^1$ or R$^2$ groups are taken together with the R$^1$ or R$^2$ groups of other units (e.g., as illustrated in FIG. 6). In various embodiments, the polysilsesquiloxane comprises any suitable number of units, such as 2 to 200 (e.g., 2-20) units and/or n is any suitable value, such as an integer between 2 and 200, e.g., 2-20 or 7-16. In certain embodiments, the cage comprises 8 units, but larger cages are optional. In additional, opened cages, wherein one of the units is absent are also optional.

In certain embodiments, each R1, R2, and R3 of formula (I) and (II) is independently H or substituted or unsubstituted hydrocarbon, such as alkyl (e.g., substituted or non-substituted, such as with alkyl, heteroalkyl, aryl, heteroaryl, hydroxyl, halo, carboxy, COOR, OCOR, or the like, such as wherein R is H, alkyl, or heteroalkyl, such as wherein R is alkyl) or aryl (e.g., substituted or non-substituted, such as with alkyl, heteroalkyl, aryl, heteroaryl, hydroxyl, halo, carboxy, COOR, OCOR, or the like, such as wherein R is H, alkyl, or heteroalkyl, such as wherein R is alkyl).

In various embodiments, any substituted radicals may be substituted with halogens such as chlorine, bromine and fluorine, an alkoxy group, an alkoxycarbonyl group, a silyl group, an amino group, alkyl, heteroalkyl, aryl, heteroaryl, hydroxyl, halo, carboxy, COOR, OCOR, (such as wherein R is H, alkyl, or heteroalkyl), a siloxane, an organosiloxane, a silsesquioxane, an organosilsesquioxane, a POSS group (e.g., comprising one or more of the structural units: RSiO$_{1.5}$, wherein R is, e.g., a hydrocarbon), a silane, an organosilane, or other silicon containing substituents. In some instances, radicals may be taken together to form a ring. The hydrocarbon group includes an aliphatic hydrocarbon group and an aromatic hydrocarbon group ("aryl"), and the aliphatic hydrocarbon group may include a chain hydrocarbon group and a cyclic hydrocarbon group. Examples of the hydrocarbon group include an alkyl group, an alkenyl group, a cycloalkyl group, a cycloalkenyl group, an aryl group, and an arylalkyl group. Alkyl groups described herein include saturated, unsaturated, straight-chain, branched, and cyclic alkyl groups (as well as groups comprising combinations thereof). The number of carbon atoms in these hydrocarbon atoms is not limited, but is usually 20 or less, and preferably 10 or less. In some instances, is an alkyl group having 1 to 8 carbon atoms. In some instances, a hydrocarbon comprises a silyl group, such as an alkyl group having 1 to 20 (e.g., 1-6) carbon atoms, and comprising a silyl group. In certain instances, the number of hydrocarbon atoms to be combined with Si is within a range from 1 to 3. In some instances, the hydrocarbon comprises an amino group and hydrocarbonoxy group, such as wherein the number of carbon atoms in the hydrocarbon group is within a range from 1 to 3.

Ceramic precursors provided herein may have a chain, cyclic or crosslinked structure, or a mixture thereof. Additional units may be present where each substituent (R type group) is optionally cross-linked to another monomeric unit of the general formula (e.g., at the N group for silazanes— e.g., through R$^{3'}$—or through R$^1$ or R$^2$ of silsesquiloxanes such cross-links may form links between separate linear chains, or form cyclic structures, or a mixture thereof). Any suitable molecular weight for such ceramic precursors is contemplated herein, such as wherein the number-average molecular weight is within a range from 100 to 100,000, e.g., from 300 to 10,000.

In some embodiments, a ceramic precursor provided herein is an organo-functionalized compound, such as an organopolysilazane or a silsesquioxane (organosilsesquiloxane). In specific embodiments, such as organo-functionalized compound comprises one or more organic functional group, such as in the place of another group of the compound (e.g., in the place of a hydrogen group). Exemplary organo-functionalized compounds include those illustrated herein wherein an R group thereof comprises an organic radical or group. Organic radicals and groups include hydrocarbon based radicals and groups that are optionally functionalized (e.g., wherein one or more carbon and/or hydrogen of the hydrocarbon is optionally substituted) with various heteroatoms, such as halides, non-metals (e.g., oxygen, nitrogen, sulfur, and/or the like), metalloids (e.g., silicon), and the like. In various instances, organic radicals comprise at least one of the following: one or more alkyl, one or more heteroalkyl, one or more aryl, and/or one or more heteroaryl. Alkyl and heteroalkyl radicals and groups optionally comprises cyclic and acyclic radicals or groups, optionally comprise branched and straight chain radicals or groups, optionally comprise saturated and unsaturated radicals or groups. A heteroalkyl group is an alkyl group wherein at least one carbon is replaced with a heteroatom (e.g., non-metal or halide), such as oxygen, sulfur, nitrogen, or the like. For example, in a heteroalkyl group, a —$CR_2$— group may be substituted with an —O— group, an —S— group, an —SO— group, an —$SO_2$— group, or an —NR— group, such as a poly(oxoalkylene) (e.g., polyethylene oxide (PEO)). Similarly, a heteroaryl group is an aryl group wherein at comprising at least one heteroatom within an aromatic ring structure. Alkyl, heteroalkyl, aryl, and heteroaryl groups are optionally substituted or unsubstituted. For example, optionally substituted groups have one or more atoms (e.g., hydrogen atoms) that are covalently bound to a group or substituent as defined above, or a free electron pair, such as on a nitrogen, may be replaced by a covalently-bound non-hydrogen substituent, such as selected from the group consisting of R, OH, SH, OR, SR, S(=O)R, $SO_2R$, halo, $NR_2$, $NR_3+$, NRCOR, $NO_2$, CN, $CO_2R$, $CONR_2$, COR, oxo (=O), and thioxo (=S). In the above substituents, each R is independently selected from H, alkyl (e.g., lower alkyl), heteroalkyl (e.g., lower heteroalkyl), aryl, heteroaryl, or the like. In addition, groups, such as "alk" and "alkyl" groups, offset in parentheticals, are optionally present or not present. For example, in "(alk) acryloxyalkyl," both or either of "alkacryloxyalkyl" and/or "acryloxyalkyl" are contemplated. Moreover, "alk" groups are "alkyl" groups are described herein.

In some instances, the compounds having structures represented by formula of (I) and/or (II), terminate in any suitable group, such as described for any R or organo-group described herein.

In some embodiments, a process herein comprises or a system provided herein is configured to provide a voltage to a nozzle, such as one provided herein. In specific embodiments, the voltage is provided to the inner conduit (e.g., the walls thereof). In certain embodiments, application of the voltage to the nozzle provides an electric field at the nozzle (e.g., at the outlet of the inner conduit thereof). In some instances, the electric field results in the formation of a "cone" (e.g., Taylor cone) (e.g., as illustrated by 106 and 107 of FIG. 1) at the nozzle (e.g., at the outlet of the inner conduit thereof), and ultimately a jet and/or plume/aerosol. In certain instances, after the formation of a cone, the jet is broken up into small and highly charged liquid droplets, which are dispersed, e.g., due to Coulomb repulsion.

In some embodiments, any suitable voltage (e.g., direct current voltage) is applied (e.g., to the nozzle). In specific embodiments, the voltage applied about 8 kV to about 30 kV, or more, depending on the number of nozzles utilized. In more specific embodiments, the voltage applied is about 10 kV to about 25 kV. In certain embodiments, a power supply is configured to provide the voltage to the nozzle.

In certain embodiments, a process herein provides or a system herein is configured to provide a pressurized gas to an outer inlet of an outer conduit of an nozzle. In some embodiments, the outer conduit is enclosed along the length of the conduit by an outer wall having an interior surface, the outer conduit having an outer conduit inlet and an outer conduit outlet. In some instances, the pressurized gas is provided from a pressurized canister, by a pump, or by any other suitable mechanism. Generally, providing pressurized gas to a nozzle (e.g., to the inlet of the outer channel) results in a high velocity gas being discharged from the nozzle (e.g., outlet of the outer channel of the nozzle). Any suitable gas pressure or gas velocity is optionally utilized in processes and/or systems herein. In specific embodiments, the gas pressure applied (e.g., to the inlet of the outer channel) is about 15 psi or more. In more specific embodiments, the gas pressure is about 20 psi or more, about 25 psi or more, or about 40 psi or more. In certain embodiments, the velocity of the gas at the nozzle (e.g., the outlet of the outer channel thereof) is about 0.5 m/s or more, about 1 m/s or more, about 5 m/s or more, about 25 m/s or more, or the like. In more specific embodiments, the velocity is about 50 m/s or more. In still more specific embodiments, the velocity is about 100 m/s or more, e.g., about 200 m/s or more, or about 300 m/s. In certain embodiments, the gas is any suitable gas, such as comprising air, oxygen, nitrogen, argon, hydrogen, or a combination thereof.

In certain embodiments, the inner and outer conduits have any suitable configuration, such as diameter. In some embodiments, the diameter of the outer conduit is about 0.2 mm to about 10 mm, e.g., about 1 mm to about 10 mm. In more specific embodiments, the diameter of the outer conduit is about 0.2 mm to about 5 mm, e.g., about 1 mm to about 3 mm. In certain embodiments, the diameter of the inner conduit is about 0.05 mm (e.g., about 0.1 mm) to about 8 mm, e.g., about 0.5 mm to about 5 mm, e.g., about 1 mm to about 4 mm. Generally, as discussed herein, the inner conduit is configured inside the outer conduit, preferably along a similar or identical axis, but slight offset configurations are also considered to be within the scope of the instant disclosure. In some embodiments, an outer wall surrounds the outer conduit, the outer wall having an interior surface (e.g., defining the outer conduit). In some embodiments, the average distance between the exterior surface of the inner wall and the interior surface of the outer wall (referred to herein as the conduit gap) is any suitable distance. In specific instances, the conduit gap is about 0.2 mm or more, e.g., about 0.5 mm or more. In more specific embodiments, the conduit gap is about 0.5 mm to about 5 mm. In certain embodiments, the gap is small enough to facilitate a high velocity gas at the nozzle and to facilitate sufficient disruption or elongation of the charged fluid (jet) ejected from the nozzle (e.g., such as to provide sufficiently small droplet sizes and sufficiently uniform inclusion dispersion in the plume and on the collection substrate). In some embodiments, the inner channel and the outer channel run along an identical or similar longitudinal axis, the length of which both the inner and outer channels running along that axis being the conduit overlap length (e.g., proximal to the terminus of either (e.g., if the terminus thereof is offset)) or both (e.g., if the terminus thereof is aligned) channels). In some embodiments, the inner conduit length, the outer conduit length, and the conduit overlap length is about 0.1 mm to about 100 mm, or more. In specific embodiments, the inner conduit length, the outer conduit length, and the conduit overlap length is about 0.5 mm to about 100 mm, e.g., about 1 mm to about 100 mm, about 1 mm to about 50 mm, about 1 mm to about 20 mm, or the like. In certain embodiments, the ratio of the conduit overlap length to the first diameter being about 0.5 to about 10, e.g., about 1 to about 10. In some embodiments, the inner conduit is longer than the outer conduit, the inner conduit protruding beyond the outer conduit, e.g., as illustrated in FIG. 1 (108 and 109) and FIG. 8. In some embodiments, the protrusion length (e.g., channel terminus offset) is about −0.5 mm to about 1.5 mm, e.g., about 0 mm to about 1.5 mm.

Figure 3:
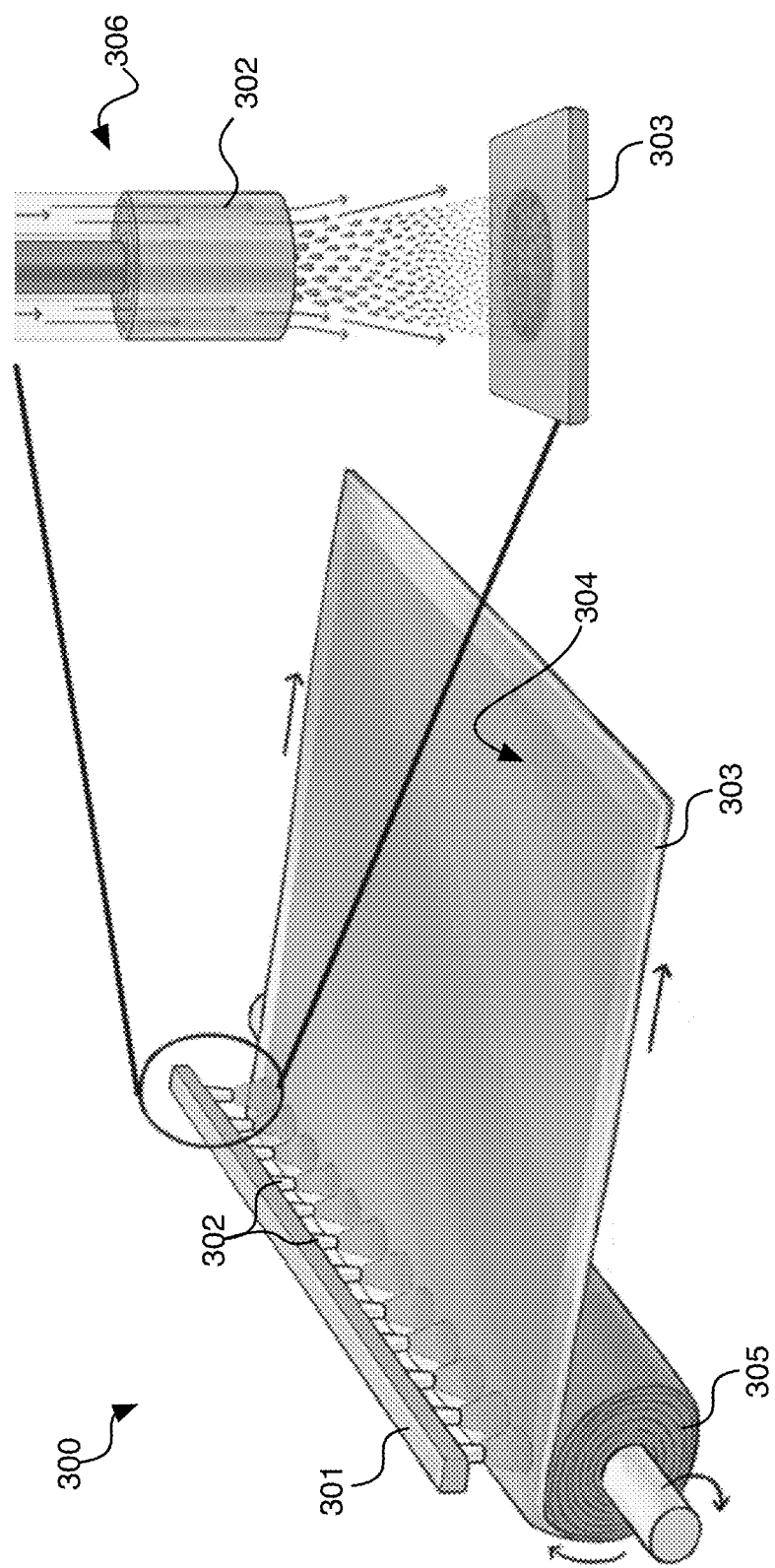

In certain embodiments, processes herein comprise collecting and/or systems herein are configured to collect (e.g., micron or sub-micron scaled) particles and/or droplets of the plume or (e.g., micron or sub-micron) fibers onto a substrate. In specific embodiments, collection of these materials allows for the formation of a uniform deposition on the substrate. Further, in some instances, given the small size of the deposition components (e.g., particles and/or droplets) formed by systems and processes described herein, it is possible to form depositions having thin and/or uniform layers, and to have good control of the thickness thereof. In some embodiments, the substrate is positioned opposite the outlet of the nozzle. FIG. 3 illustrates an exemplary system 300 provided herein comprising a bank 301 of electrospray nozzles 302 positioned opposite a substrate 303. FIG. 3 also illustrates an exploded view 306 of a nozzle 302 and a substrate 303. As is exemplarily illustrated in FIG. 3, spraying/spinning (e.g., electrospraying or electrospinning) a fluid stock onto a substrate forms a deposition 304 thereon. In some embodiments, the substrate and/or the nozzle bank is configured to be mobile, allowing facile deposition onto a substrate. As illustrated in FIG. 3, the substrate 303 is optionally configured to be affixed to a roll 305, and/or the nozzle bank is configured to move along the surface of a substrate, depositing a coating on the substrate as the bank moves. In specific embodiments, the substrate is itself grounded or positioned between a grounded component (the "collector") and the nozzle. Alternatively, a voltage, such as described herein, is applied to the "collector" and the nozzle is grounded.

Further, in some embodiments, it is desirable that any inclusions in the fluid stock are dissolved and/or well dispersed prior to processing, e.g., in order to minimize clogging of the nozzle, ensure good uniformity of dispersion of any inclusions in the resulting deposition, and/or the like. In specific embodiments, the fluid stock is agitated prior to being provided to the nozzle (e.g., inner conduit inlet thereof), or the system is configured to agitate a fluid stock prior to being provided to the nozzle (e.g., by providing a mechanical stirrer or sonication system associated with a fluid stock reservoir, e.g., which is fluidly connected to the inlet of the inner conduit of an electrospray nozzle provided herein).

EXAMPLES

Example 1: Electrospray Polymer Film Membrane

A fluid stock comprising 1-5 wt. % polyvinylalcohol (PVA) in water is prepared. The solution is provided to a non-gas-controlled electrospray nozzle, to which a direct voltage of about 10 kV to about 15 kV is maintained. A grounded collector is positioned opposite the electrospray nozzle, at a distance of about 20 cm to about 25 cm. High speed imaging of the electrospray process is illustrated in FIG. 1 (left panel), and a PVA deposition is collected on the collector, as illustrated in FIG. 2 (left panels). As is illustrated in FIG. 2, the deposition is irregular, with large PVA beads being evident.

A 1-5 wt. % PVA solution is also electrosprayed by injecting the solution into a gas (air) stream ($Q_{air}$ of about 11 SCFH) using a coaxially configured nozzle as described herein. A direct voltage of about 10 kV to about 15 kV is maintained at the nozzle. A grounded collector is positioned opposite the electrospray nozzle, at a distance of about 20 cm to about 25 cm. High speed imaging of the electrospray process is illustrated in FIG. 1 (right panel), and a PVA deposition is collected on the collector, as illustrated in FIG. 2 (right panels). As is illustrated in FIG. 2, the deposition is highly uniform, with no large PVA beads being evident.

Example 2: Electrospin Polymer Fiber Mat Membrane

A fluid stock is prepared similar to as described in Example 1, with a concentration of >5% polyvinylalcohol (PVA) in water. The solution is provided to a gas-controlled electrospin nozzle, to which a direct voltage of about 10 kV to about 15 kV is maintained. A grounded collector is positioned opposite the electrospin nozzle, at a distance of about 20 cm to about 25 cm. Fibers are electrospun with gas under conditions similar to those identified in Example 1.

Example 3: Polymer-Ceramic Hybrid Membrane

Using a process similar to that described in Example 2, a fluid stock is prepared using polyacrylonitrile (PAN) in DMF (8-15 wt. %) and adding a ceramic precursor (a silazane). The fluid stock is processed using a similar gas-assisted process as described in Example 2 and collected. The fibers are cured at a rate suitable for obtaining a continuous ceramic matrix (co-continuous with polymer), with a ceramic coat. A fibrous mat is collected and prepared into a membrane, such as illustrated in FIG. 10.

A strip of the membrane is prepared. One end of the membrane strip placed into an electrolyte bath. A strip of conventional polyolefinic separator (CELGARD® 2400) is similarly treated. After allowing the electrolyte to absorb into the membranes (wick), the uptake of electrolyte is compared. FIG. 10 illustrates the dramatically improved wettability of an exemplary polymer-ceramic hybrid membrane material provided herein relative to a polypropylene (PP) separator by CELGARD®. As is demonstrated, polymer-ceramic hybrid membrane provided herein have been observed to have exceptional electrolyte wicking capabilities (corresponding to wettability) relative to more conventional polyolefinic separator membranes A sample of the polymer-ceramic hybrid membrane is also tested for air permeability at a variety of pressure differentials (on one side of the membrane relative to the other), with a polypropylene (PP) separator by CELGARD® (CELGARD® 2400) also tested for comparison purposes. As illustrated in FIG. 11, exemplary polymer-ceramic hybrid membrane material provided herein demonstrated greatly superior fluid permeability relative to a polyolefinic separator by CELGARD®.

The thermal stability of the exemplary polymer-ceramic hybrid membrane was also tested and compared to the thermal stability of a polypropylene (PP) separator by CELGARD®. The results are illustrated in FIG. 12, which demonstrates the enhanced thermal stability of an exemplary polymer-ceramic hybrid membrane material provided herein. As is demonstrated, the exemplary polymer-ceramic hybrid membrane provided herein is observed to have exceptional thermal stability up to 200° C. and beyond, whereas more conventional polyolefinic separator membranes rapidly fail at temperatures below even 100° C.

Figure 25:
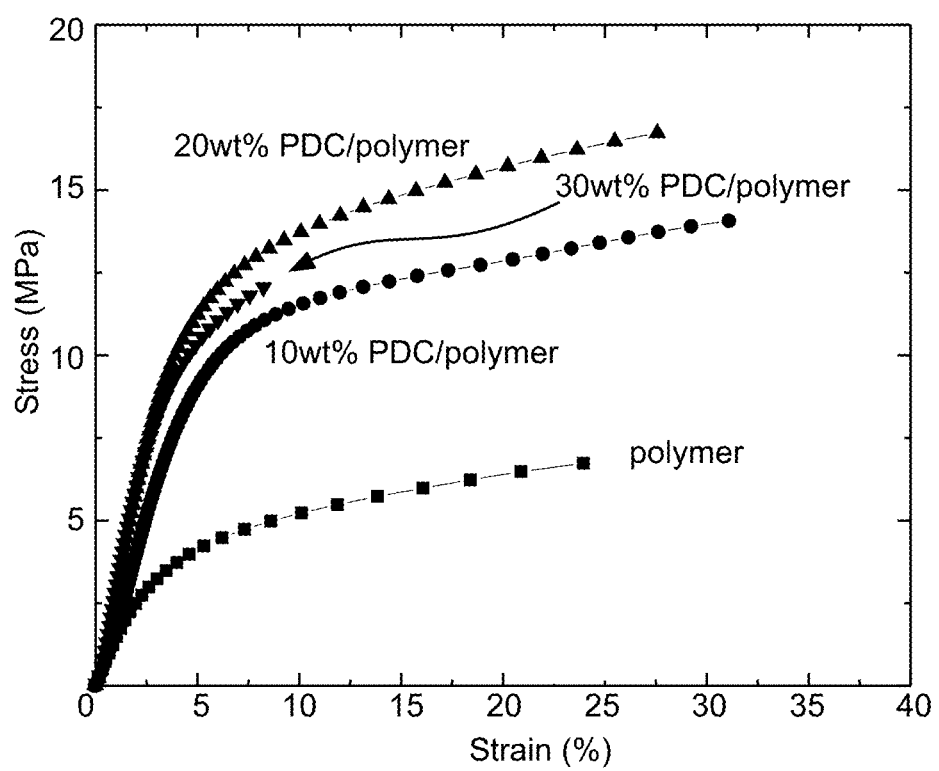
FIG. 25 illustrates the mechanical properties of various exemplary polymer-ceramic hybrid membranes described herein.

Further, inclusion of the continuous ceramic material to the fiber morphology serves to improve the mechanical properties of the membrane. FIG. 25 illustrates the strength of the fibrous material, at various ceramic loadings. As illustrated, all ceramic containing fibers demonstrated significant improvements in strength over naked polymer fibrous material. Increasing strength is observed for the fibers up to 20 wt. % precursor, but decreases and becomes more brittle when going from 20 wt. % to 30 wt. %.

Example 4: Polymer-Ceramic Hybrid Membrane—Various Precursors

Using a process similar to that described in Example 3, a fluid stock is prepared using polyacrylonitrile (PAN) in DMF and adding a ceramic precursor. A variety of fluid stock samples are prepared to manufacture a variety of exemplary polymer-ceramic hybrid materials. A first sample is prepared using a silazane (organic polysilazane (OPSZ); a second sample is prepared using a silsesquioxane (MSQ); a third sample is prepared using a siloxane (MSX); and a fourth sample is prepared using a polysilsesquioxane (PSSQ). FIG. 17 illustrates TEM images of a microtomed cross-section of fibers of such materials. As can be seen, all polymer-ceramic hybrid materials comprise a polymer matrix with ceramic embedded therewithin. In two of the samples (OPSZ and MSQ), a good coating/shell of ceramic is also observed. In one of the samples (MSX), a partial coating/shell is observed. And in, one sample (PSSQ), no coating/shell is observed.

These separators are assembled into functional lithium ion battery sells and their capacities and capacity retentions observed. As illustrated in FIG. 16, the polymer-ceramic hybrid materials with a good outer ceramic coating of the polymer matrix material demonstrate the better performance profile (particularly with regard to capacity retention).

Example 5: Polymer-Ceramic Hybrid Membrane—Embedded Morphology

Using a process similar to that described in Example 3, a fluid stock is prepared using polyacrylonitrile (PAN) in DMF and adding a combination of ceramic precursors (a sicilic acid (TEOS) and a silazane). Hybrid structures are compared for three different samples, the first with 0% TEOS (on a weight basis of ceramic precursor provided in the fluid stock, the remainder being a polysilazane), the second with 20% TEOS, and the third with 40% TEOS. The resulting hybrid structures are observed to have discrete domains of ceramic in the internal matrix of the resultant materials, with higher concentrations of TEOS providing interconnected ceramic domains embedded within the polymer matrix. All samples are observed to have a good coating/shell of ceramic around the polymer matrix material. FIG. 15 demonstrations an illustrative representation of the difference in ceramic morphologies embedded in the polymer matrix for the 0% TEOS and 40% TEOS samples.

The membranes are prepared as a separator as described in the previous examples and prepared in a lithium ion battery. Identical batteries are prepared using PAN-only membranes and a polyolefinic CELGARD® membrane as separators therein. As illustrated in FIG. 14, improved performance is observed for the combination of the silicic acid and polysilazane versus just the polysilazane alone, or with the ceramic-free PAN membrane or ceramic-free polyolefinic CELGARD® separators.

Figure 22:
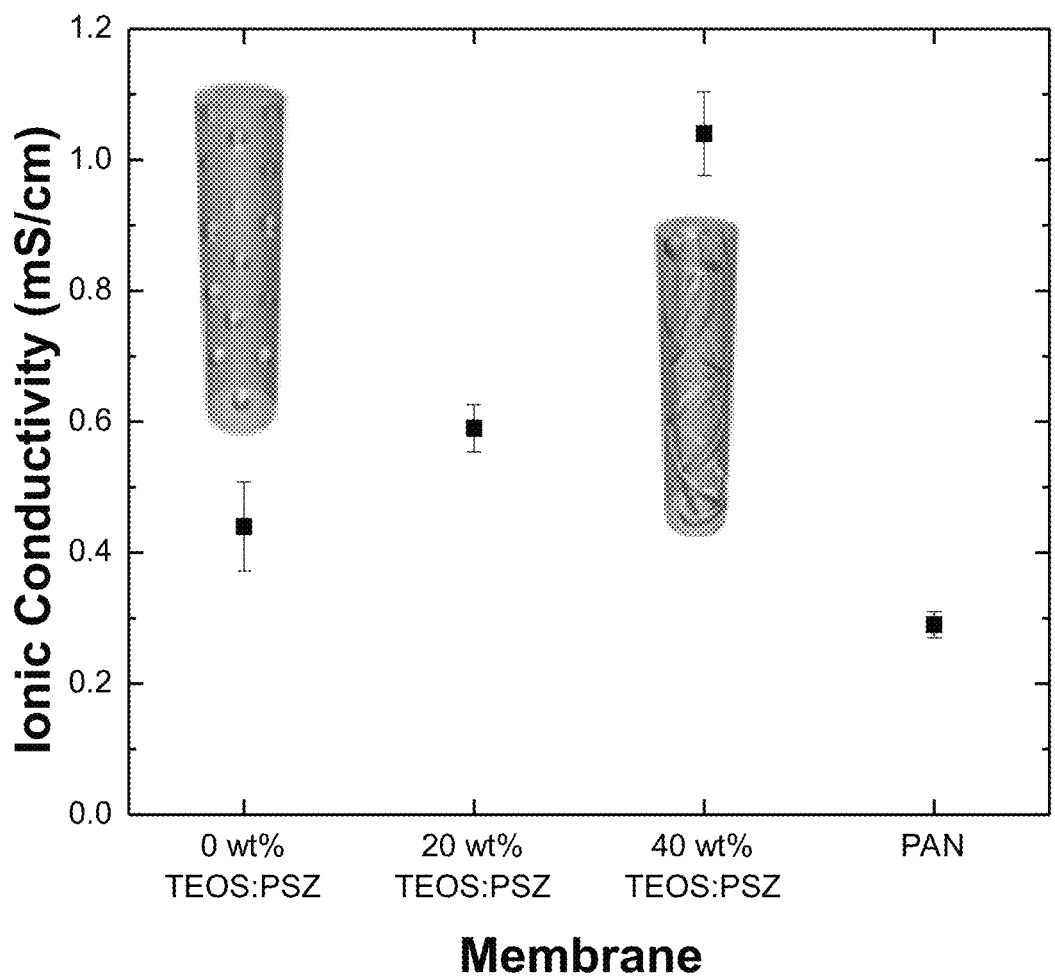
FIG. 22 illustrates the ionic conductivity of various exemplary polymer-ceramic hybrid membranes described herein.
Figure 23:
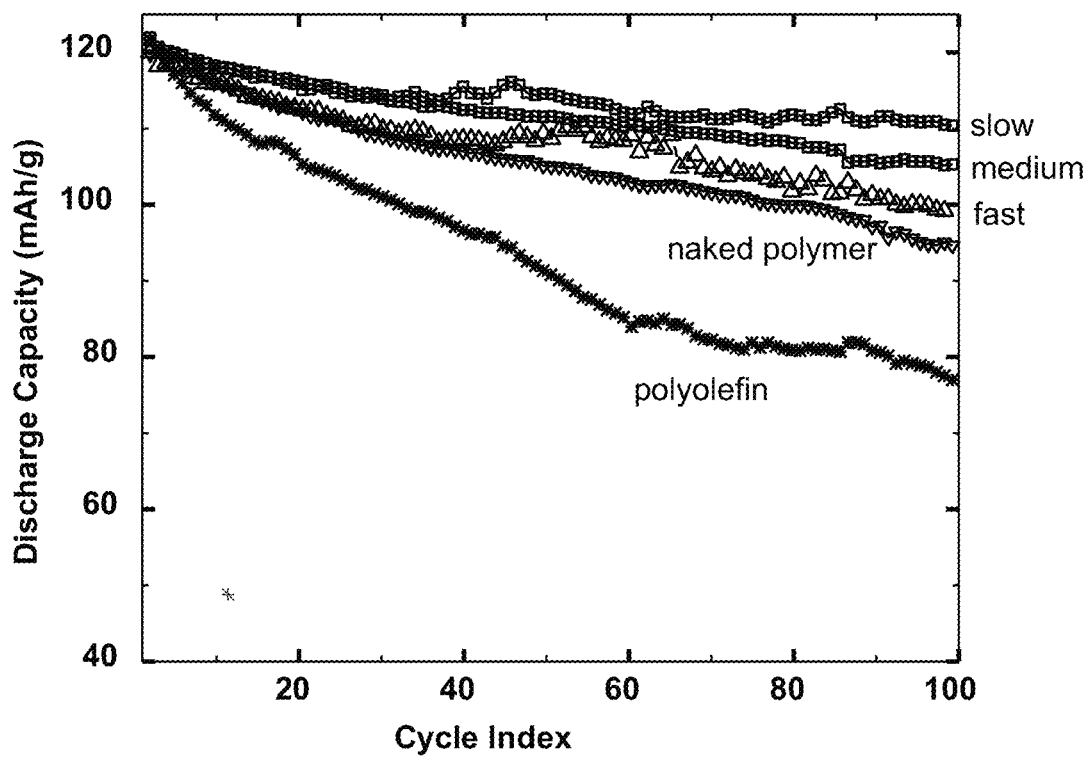
FIG. 23 illustrates the capacity retention of various exemplary polymer-ceramic hybrid membranes described herein.
Figure 24:
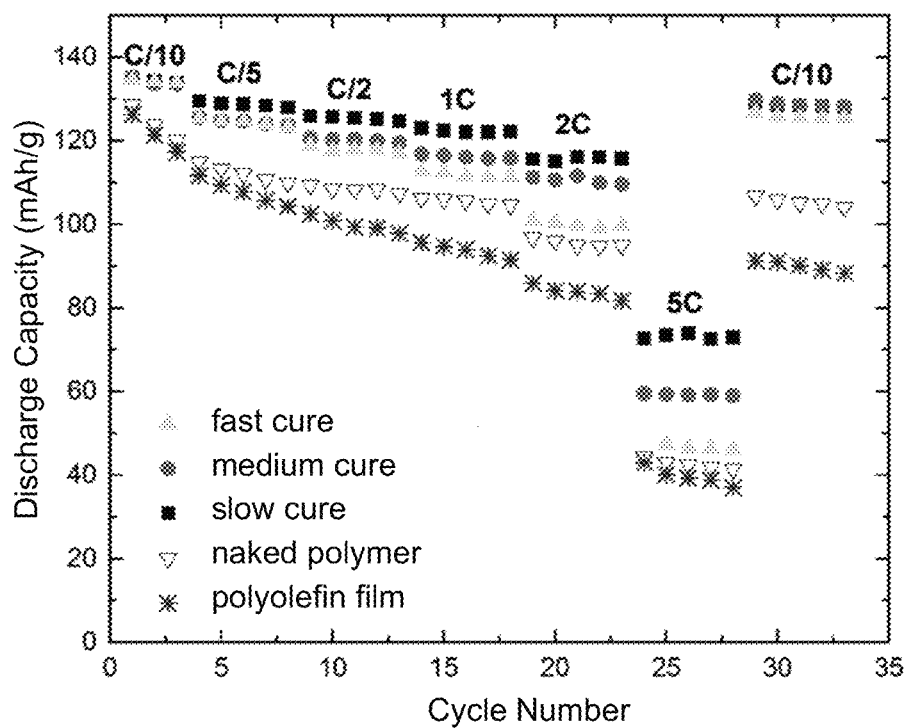
FIG. 24 illustrates the rate capability of various exemplary polymer-ceramic hybrid membranes described herein.

Internal ceramic morphologies are also studied by varying the cure speed of polymer-ceramic nanofibers prepared similarly to those described above. Using a loading of 30 wt. % polymer derived ceramic (relative to polymer), fiber membranes are produced using process similar to that described in Example 3. Using the same loading (30 wt. %), polymer derived ceramic are fast-cured, medium-cured, and slow-cured. The fast-cured fiber membranes possess discrete domains of ceramic embedded within a polymer fiber matrix; the slow-cured fiber membranes possess continuous domains of ceramic embedded within a fiber matrix; and the medium-cured fiber membranes possess some continuous and some isolated domains of ceramic. Generally, the fast, medium, and slow curing samples readily cure, particularly in fiber form, the curing rates only being relative to one another. To ensure complete curing, all samples are cured in a low temperature furnace for a few hours prior to testing. The ionic conductivity of the various materials is measured and illustrated in FIG. 22. The fast- and medium-cured membranes demonstrate a significant improvement in ionic conductivity over pure polymer fiber membranes, but the slow-cured fibers demonstrate an ionic conductivity that is more than double that of the fast-cured fiber membranes. Moreover, full cells are prepared using LiCoO2 at a loading of 14.4 mg/cm2 and graphite at a loading of 11.3 mg/cm2. Using identical systems and processes, various cells are prepared, including cells using naked polyolefin films (Celgard) and polymer fiber membranes. At a charge and discharge rate of C/2, the polyolefin film cells were observed to only have a capacity retention of 60% after 100 cycles. By contrast, as illustrated in FIG. 23, polymer membranes were observed to have a capacity retention of about 79% after 100 cycles. Inclusion of ceramic in the membrane further improved capacity retention, with fast-cured membranes providing a capacity retention of about 84% after 100 cycles, medium-cured membranes providing a capacity retention of about 87% after 100 cycles, and the slow-cured membranes providing a capacity retention of at least 90% after 100 cycles. Further, as illustrated in FIG. 24, slow-cured membranes demonstrate excellent rate capabilities, doubling the capacity of not only naked polyolefin film and polymer fiber membranes at rates of 5 C, but also doubling the capacity of the fast-cured membranes at rates of 5 C. Moreover, even at lower rates, the slow-cured membranes demonstrate the best performance results. Indeed, very little drop off in capacity is observed when moving from slow rates of C/5 (discharge over 5 hours) to relatively fast rates of 2 C (discharge over 30 minutes).

Example 6: Polymer Membrane—Film

Using a process similar to that described in Example 1, a fluid stock is prepared using polyacrylonitrile (PAN) in DMF. The fluid stock is processed using a similar gas-assisted process as described in Example 1 and collected. A film mat is collected and prepared into a membrane, such as using a banked nozzle system, such as illustrated in FIG. 3.

Example 7: Polymer-Ceramic Hybrid Membrane—Film

Using a process similar to that described in Example 1, a fluid stock is prepared using polyacrylonitrile (PAN) in DMF and adding a ceramic precursor (a silazane). The fluid stock is processed using a similar gas-assisted process as described in Example 1 and collected. A film mat is collected and prepared into a membrane, such as using a banked nozzle system, such as illustrated in FIG. 3.

The membranes are prepared as a separator as described in the previous examples and prepared in a lithium ion battery. Identical batteries are prepared using PAN-only film membranes (from Example 6) and a polyolefinic CELGARD® membrane as separators therein.

FIG. 18 illustrates capacities and rate capabilities of exemplary membrane separators provided herein relative to a commercial polyolefinic separator by CELGARD®. As can be seen, the porous film separators provided herein provide very good capacities (relative to the CELGARD®) separator, and excellent rate capabilities. In particular, after initiation of the separators for a few cycles at lower charge rates, at a charge rate of 1 C the polymer and polymer-ceramic hybrid porous film membrane separators provided herein (e.g., prepared using a gas-assisted electrospray process herein) have excellent capacities (relative to a conventional polyolefin separator under identical conditions). Similarly high capacities are also observed at rates of 2 C (complete charge in 30 min), 3 C (complete charge in 20 min), and 4 C (complete charge in 15 min). Meanwhile, conventional polyolefinic separators are observed to initially have a rapid decrease in capacity and ultimately fail after only a few cycles. In the comparison, the two polymer-hybrid ceramic materials have the best performance after every cycle beginning with the 1 C cycling, with the polymer materials provided herein just below the hybrid materials, and the conventional polyolefinic separators performing much more poorly.

Figure 19:
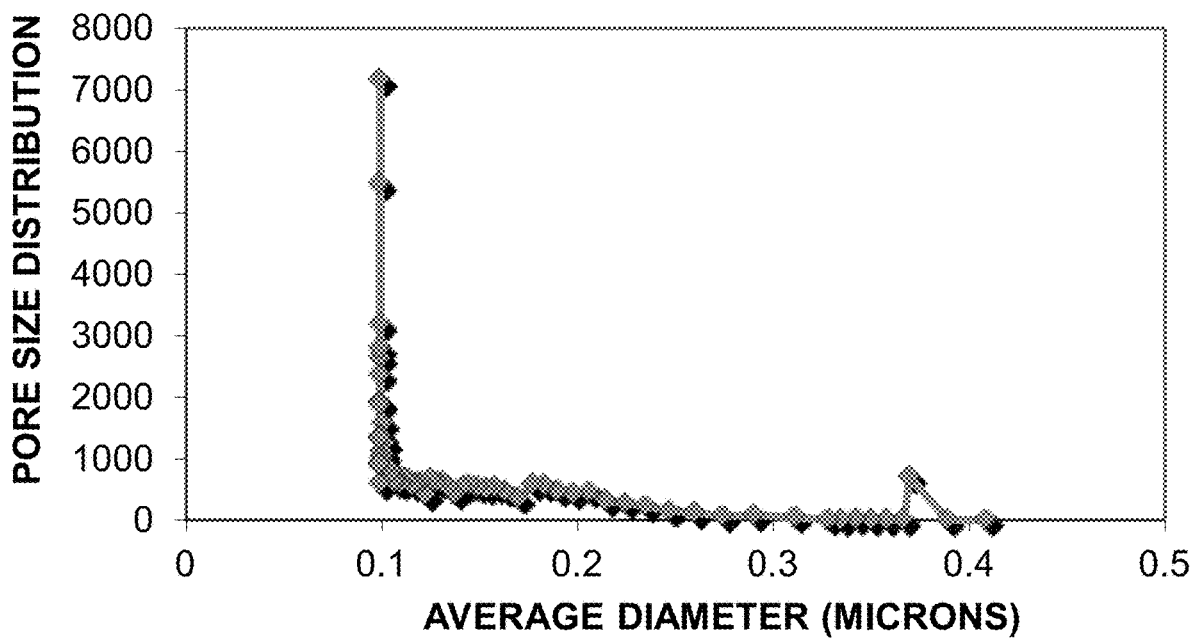
FIG. 19 illustrates the pore size distribution of an exemplary mesoporous polymer (PAN)/ceramic film separator.

In addition, the mesoporous nature of such film materials is illustrated in FIG. 19. As is illustrated, such materials have a very high concentration of pores about 0.1 micron or below, with no observed pore structures above about 0.4 micron. Nevertheless, such materials demonstrate excellent rate capabilities, capacities, and the like when configured into lithium cells, such as noted in Example 8.

Example 8: Polymer-Ceramic Hybrid Membrane—Film

Figure 21:
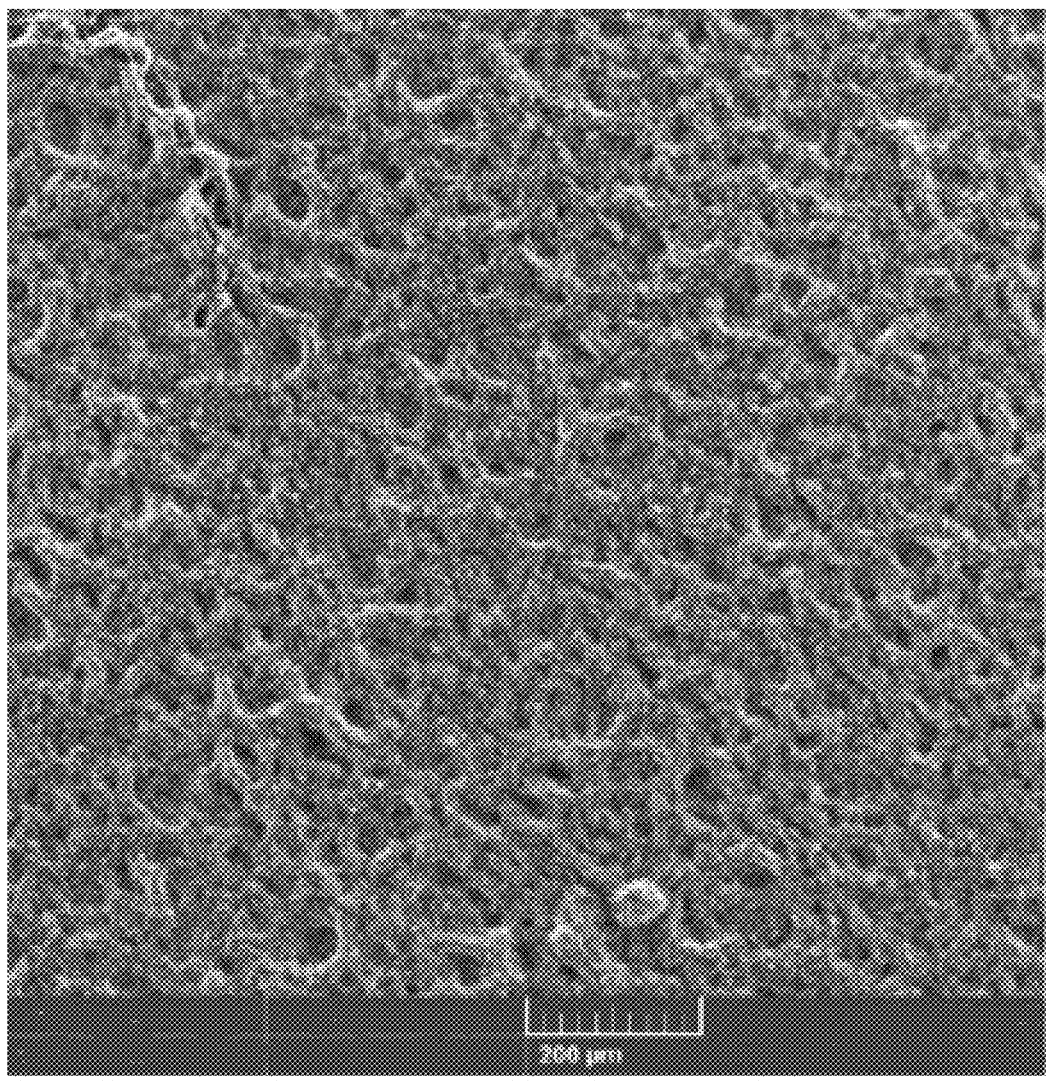
FIG. 21 illustrates an SEM image of an exemplary polymer/ceramic composite film membrane provided herein.

Using a process similar to that described in Example 7, a fluid stock is prepared using polyacrylonitrile (PAN), polyethylene oxide (PEO) and a ceramic precursor (a silazane). The fluid stock is processed using a similar gas-assisted process as described in Example 7 and collected. A film mat is collected and prepared into a membrane, such as using a banked nozzle system, such as illustrated in FIG. 3. FIG. 21 illustrates an SEM image of the polymer/ceramic composite film. The film is washed with an aqueous medium to afford a porous film membrane.

Example 9: Polymer-Ceramic Hybrid Membrane—Film & Mat

Figure 20:
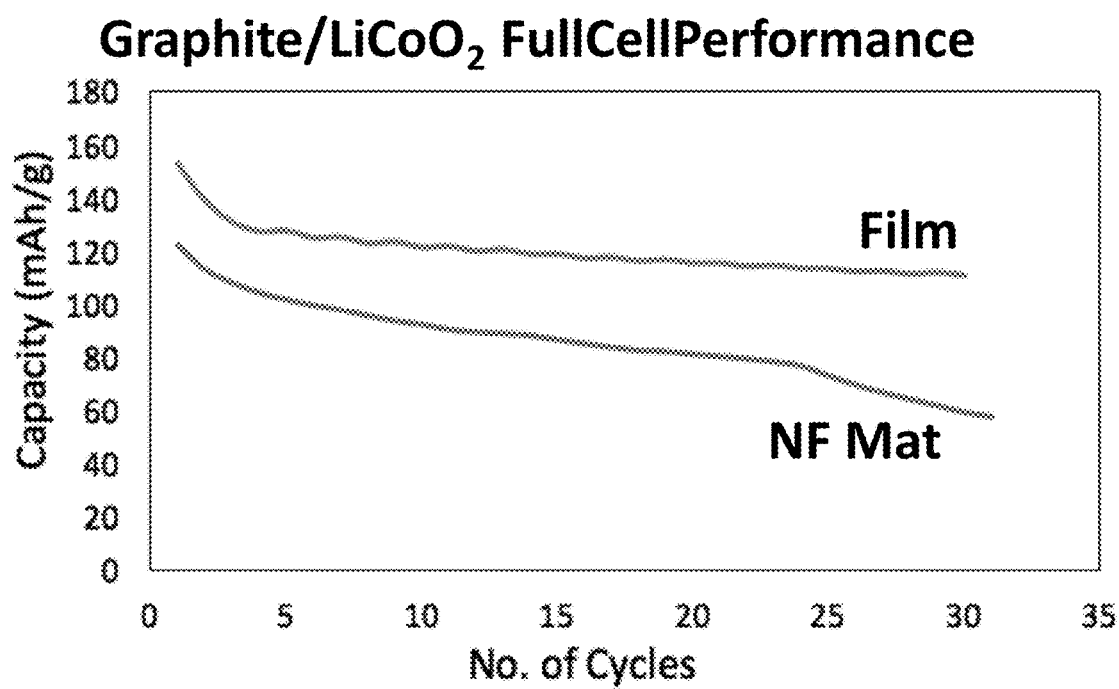
FIG. 20 illustrates full cell performance of an exemplary polymer/ceramic film separator and a of an exemplary polymer/ceramic nanofiber mat separator.

Using processes of the examples provided above, a polymer (PAN)/ceramic mesoporous film and a polymer (PAN)/ceramic nanofiber mat are prepared as thin film membranes and are prepared into a full cell using a graphite anode and a lithium cobalt oxide (LiCoO2) cathode. The excellent capacity of both cells are illustrated in FIG. 20, with the improved benefit of the film configuration illustrated (despite decreased porosity thereof).

What is claimed is:

1. A battery separator comprising a porous membrane comprising a fiber mat;
   the fiber mat comprising a fiber comprising a core and a surface;
   the fiber comprising a polymer and a ceramic, the ceramic comprising one or more continuous matrix of ceramic;
   the one or more continuous matrix of ceramic comprising a continuous ceramic shell matrix, the continuous ceramic shell matrix coating at least 50% of the surface of the fiber;
   the core comprising the polymer and a continuous ceramic core matrix; and
   the battery separator having an average thickness of about 1 micron to about 25 micron.

2. The battery separator of claim 1, wherein the fiber mat has a porosity of about 40% to about 80%.

3. The battery separator of claim 1, wherein the battery separator has a thickness of about 5 micron to about 20 micron.

4. The battery separator of claim 1, wherein the battery separator has a pore size distribution d98 of about 1 micron or less.

5. The battery separator of claim 4, wherein the battery separator has a pore size distribution d99 of about 1 micron or less.

6. The battery separator of claim 1, wherein the battery separator has a median (d50) pore size of less than 0.2 micron.

7. The battery separator of claim 1, wherein the average thickness of the ceramic shell is less than 30% the thickness of the fiber core.

8. The battery separator of claim 1, wherein the fiber has an average thickness of less than 5 micron.

9. The battery separator of claim 8, wherein the fiber has an average thickness of less than 2 micron.

10. The battery separator of claim 1, wherein the polymer is polyvinyl alcohol (PVA), polyacrylonitrile (PAN), polyvinylidene difluoride (PVDF), polyvinylpyrrolidone (PVP), a polyimide (PI), polyethylene (PE), polypropylene (PP), or a combination thereof.

11. The battery separator of claim 1, wherein the continuous ceramic core matrix is co-continuous with the polymer.

12. The battery separator of claim 1, wherein the battery separator comprises about 70 wt. % to about 90 wt. % polymer, and about 10 wt. % to about 30 wt. % ceramic.

13. The battery separator of claim 1, wherein the ceramic comprised a silicon-based ceramic.

14. The battery separator of claim 1, wherein the ceramic comprises a polymer derived ceramic (PDC).

15. The battery separator of claim 14, wherein the polymer derived ceramic is derived from a poly(organosilazane), a poly(organosilylcarbodiimide), a polysiloxane, a poly(organosilsesquioxane), or a poly(organosiloxane).

16. A battery separator comprising a non-fibrous thin film;
   the film comprising a polymer and a ceramic, the ceramic comprising one or more continuous matrix of ceramic;
   the film comprising a first surface, a second surface, and a core, the core being configured between the first surface and the second surface;
   the one or more continuous matrix of ceramic comprising a continuous ceramic coating matrix, the continuous ceramic coating matrix coating at least 50% of the surface of the film, excluding pores;
   the core comprising the polymer and a ceramic core material; and
   the film having a porosity of about 10% to about 70% and the battery separator having an average thickness of about 1 micron to about 20 micron.

17. The battery separator of claim 16, wherein the ceramic core material forms a continuous ceramic core matrix.

18. The battery separator of claim 16, wherein the polymer is polyvinyl alcohol (PVA), polyacrylonitrile (PAN), polyvinylidene difluoride (PVDF), polyvinylpyrrolidone (PVP), a polyimide (PI), polyethylene (PE), polypropylene (PP), or a combination thereof.

19. The battery separator of claim 16, wherein the continuous ceramic core matrix is co-continuous with the polymer.

20. The battery separator of claim 16, wherein the ceramic is polymer derived ceramic derived from a poly(organosilazane), a poly(organosilylcarbodiimide), a polysiloxane, a poly(organosilsesquioxane), or a poly(organosiloxane).

\* \* \* \* \*